United States Patent [19]
Yamashita et al.

[11] Patent Number: 5,936,157
[45] Date of Patent: Aug. 10, 1999

[54] THERMOSENSITIVE FLOW RATE DETECTING ELEMENT AND FLOW RATE SENSOR USING SAME

[75] Inventors: Akira Yamashita; Masahiro Kawai; Tomoya Yamakawa; Yutaka Ohashi, all of Tokyo, Japan

[73] Assignee: Mitsubishi Denki Kabushiki Kaisha, Tokyo, Japan

[21] Appl. No.: 08/968,569

[22] Filed: Nov. 12, 1997

[30] Foreign Application Priority Data

Jul. 3, 1997 [JP] Japan .................................. 9-178060

[51] Int. Cl.⁶ ...................................................... G01F 1/68
[52] U.S. Cl. ........................................................ 73/204.26
[58] Field of Search .......................... 73/204.26, 204.25, 73/204.24

[56] References Cited

U.S. PATENT DOCUMENTS

| | | | |
|---|---|---|---|
| 4,966,037 | 10/1990 | Sumner et al. | 73/204.26 |
| 5,722,288 | 3/1998 | Manaka | 73/204.26 |
| 5,723,784 | 3/1998 | Lembke et al. | 73/204.26 |

FOREIGN PATENT DOCUMENTS

| | | |
|---|---|---|
| 43 38 890 | 9/1994 | Germany . |
| 43 38891 | 9/1994 | Germany . |
| 6-249693 | 9/1994 | Japan . |

*Primary Examiner*—George Dombroske
*Assistant Examiner*—Jewel V. Thompson
*Attorney, Agent, or Firm*—Sughrue, Mion, Zinn, Macpeak & Seas, PLLC

[57] ABSTRACT

A thermosensitive flow rate detecting element having a flat substrate is provided with a gap having an opening on at least one side thereof for the flow of a fluid, an insulating support film provided on the one side of the substrate, a sensor unit which has a heating element for heating the fluid and a thermosensitive element for detecting temperature of the fluid provided in the upper position of the opening on the insulating support film, and a fluid temperature measuring element, provided at a distance from the sensor unit on the one side of the flat substrate, for detecting temperature of the fluid. The thermosensitive flow rate detecting element measures flow rate or flow velocity of the fluid on the basis of a temperature detected by the thermosensitive element, by keeping heating temperature of the heating element at a level higher than a temperature detected by the fluid temperature measuring element by a prescribed difference in temperature. A first notch is provided on the flat substrate near the fluid temperature measuring element and is formed by removing a part of the flat substrate from either side thereof so as not to reach the remaining side thereof.

16 Claims, 14 Drawing Sheets

THERMOSENSITIVE FLOW RATE DETECTING ELEMENT AND FLOW RATE SENSOR USING SAME

BACKGROUND OF THE INVENTION

1. Field of the Invention

The present invention relates to a flow rate detecting element and a flow rate sensor for measuring an amount of inlet air of an internal combustion engine, for example, and more particularly, to a flow rate detecting element and a flow rate sensor having a heating unit for measuring a flow velocity or a flow rate of a fluid, on the basis of the heat transfer phenomenon to the fluid, from the heating unit or a portion heated by the heating unit.

2. Description of the Related Art

FIG. 26 is a plan view illustrating a conventional thermosensitive flow rate detecting element disclosed, for example, in Japanese Unexamined Patent Publication No. 6-249,693; and FIG. 27 is a sectional view of FIG. 26 cut along the line XXVII—XXVII.

In FIGS. 26 and 27, insulating support films 23a and 23b are formed separately on a surface of a flat substrate 1 made of silicon. A heating resistance element 4 as a heating element is formed on the support film 23a. A fluid temperature measuring element 7 is formed on the support film 23b. Air spaces 27a and 27b are provided, respectively, on the flat substrate 1 under the heating resistance element 4 and the fluid temperature measuring element 7. These air spaces 27a and 27b are formed by applying etching from the other side of the flat substrate 1 so as not to damage the support films 23a and 23b and removing a part of the flat substrate 1 up to the support films 23a and 23b. Electrode terminals 28 are provided on one side of the flat substrate 1, and the heating resistance element 4 and the fluid temperature measuring element 7 are connected through a conductive duct 29 to electrode terminals 28.

A temperature control circuit shown in FIG. 25 comprises a Wheatstone bridge circuit for keeping temperature of the heating resistance element 4 at a certain temperature higher than a peripheral temperature detected by the fluid temperature measuring element 7. This Wheatstone bridge circuit has a side composed of the heating resistance element 4 and a resistance 21b, and another side composed of the fluid temperature measuring element 7 and a resistance 21a. A differential amplifier 22 acts to take balance of the bridge circuit by changing output potential to keep power consumed by the heating resistance element 4 at a certain level.

Control is performed so as to keep temperature of the heating resistance element 4 at a level higher by 200C than a peripheral temperature detected by the fluid temperature measuring element 7.

In the flow rate detecting element having the configuration as described above, the heating resistance element 4 is heated by current applied by the terminal 28 and the conductive duct 29. The heating resistance element 4 is designed so that resistance varies with temperature. The heating resistance element 4 is cooled by a flowing fluid. The extent of this cooling depends upon the mass flow of the fluid. The intensity of flow of the fluid is therefore determined by measuring electric resistance of the heating resistance element.

In the flow rate detecting element having the configuration as described above, heat generated in the heating resistance element 4 is conducted through the support films 23a and 23b and the flat substrate 1 to the fluid temperature measuring element 7. The fluid temperature measuring element 7 is therefore provided at a position free from heat affection from the heating resistance element 4.

A diaphragm structure is achieved by providing an air space 27a under the heating resistance element 4. A change in flow rate or flow velocity of the fluid to be measured can therefore rapidly be responded. Because the air space 27b is provided under the fluid temperature measuring element 7, it is possible to rapidly respond to a change in temperature of the fluid to be measured.

The conventional thermosensitive flow rate detecting element has a sensor unit of the diaphragm structure composed of a heating resistance element 4 to permit rapid response to a change in flow rate or flow velocity of the fluid to be measured. Further, the air space 27b reaching the support film 23b is provided on the flat substrate 1 to reduce the heat capacity of the fluid temperature measuring element 7 and to permit rapid response to a change in temperature of the fluid to be measured.

However, the conventional thermosensitive flow rate detecting element suffers from a problem of a serious decrease in strength of the flat substrate 1 because of the provision of the two air spaces 27a and 27b reaching the support films 23a and 23b on the flat substrate, and hence a decrease in reliability of the flow rate detecting element.

In the conventional flow rate detecting element, as described above, the two air spaces 27a and 27b reaching the support films 23a and 23b on the flat substrate 1 with a view to improving response to a change in flow rate or flow velocity of the fluid to be measured and response to a change in temperature of the fluid to be measured. It is therefore difficult to design a flow rate detecting element while ensuring a high reliability in terms of strength.

When the air space 27b under the fluid temperature measuring element 7 is abolished in order to ensure a satisfactory reliability in strength of the fluid temperature measuring element, the heat capacity of the fluid temperature measuring element 7 becomes larger, thus causing a decrease in response of the fluid temperature measuring element 7 to a change in fluid temperature. Since the heating resistance element 4 is controlled so as to be at a temperature higher by 200C than a temperature detected by the fluid temperature measuring element 7, a delay in response of the fluid temperature measuring element 7 to fluid temperature causes also a delay in temperature control of the heating resistance element 4, thus leading to a decrease in response of the flow rate sensor incorporating the flow rate detecting element.

The distance between the heating resistance element 4 and a fluid temperature measuring element 7 is short. Therefore, the fluid temperature measuring element 7 is thermally affected by the heating resistance element 4, heat generated in the heating resistance element 4 causes an increase in temperature of the fluid temperature measuring element 7. Temperature of the heating resistance element 4 would thus be controlled on the basis of the increased temperature of the fluid temperature measuring element 7, thus resulting in a thermal runaway of the heating resistance element 4. So as to be free from heat affection from the heating resistance element 4, therefore, it is necessary to provide the fluid temperature measuring element 7 at a prescribed distance from the heating resistance element 4, and this prevents downsizing effort of the apparatus.

When measuring an amount of inlet air of an automobile internal combustion engine, for example, it is necessary to detect an accurate temperature even during running, i.e., upon sudden change in inlet air temperature at entry or exit of a tunnel. The flow rate detecting element is therefore required to have a good response to an inlet air temperature. Further, because the maximum flow rate of inlet air sometimes reaches a value near 200 m/s, the flow rate detecting element is required to have a prescribed strength.

In the conventional flow rate detecting element, however, strength must be reduced for the improvement of response, and it is very difficult to achieve a design suitable for measuring an amount of inlet air of an internal combustion engine.

SUMMARY OF THE INVENTION

The present invention was developed to solve the problems as described above, and has an object to provide a thermosensitive flow rate detecting element permitting improvement of response to a change in fluid temperature while keeping a high reliability in strength of the fluid temperature measuring element, and downsizing, and a flow rate sensor using the same.

In order to achieve the above object, according to one aspect of the invention, there is provided a thermosensitive flow rate detecting element comprising a flat substrate provided with a gap having an opening on at least one side thereof for the flow of a fluid, an insulating support film provided on the one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on the one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein a first notch is provided on the flat substrate near the fluid temperature measuring element and is formed by removing a part of the flat substrate from either side thereof so as not to reach the remaining side thereof.

According to another aspect of the present invention, there is provided a thermosensitive flow rate detecting element comprising a flat substrate provided with a gap having an opening on at least one side thereof for the flow of a fluid, an insulating support film provided on the one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on the one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein a thin film made of a good-thermal-conductivity material is provided in the upper portion of the fluid temperature measuring element in a state insulated from the fluid temperature measuring element.

According to another aspect of the present invention, there is provided a thermosensitive flow rate detecting element comprising a flat substrate provided with a gap having an opening on at least one side thereof for the flow of a fluid, an insulating support film provided on the one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on the one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein a second notch formed by removing a part of the flat substrate is provided on a portion of the flat substrate between the sensor unit and the fluid temperature measuring element, so as to cross a thermal conduction path from the sensor unit to the fluid temperature measuring element.

According to another aspect of the present invention, there is provided a thermosensitive flow rate detecting element comprising a flat substrate provided with a gap having an opening on at least one side thereof for the flow of a fluid, an insulating support film provided on the one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on a side on the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein thermal conductive inhibiting members having a thermal conductivity lower than those of the supporting film and the protecting film are provided at portions corresponding to the supporting film and the protecting film between the sensor unit and the fluid temperature measuring element, so as to cross a thermal conduction path from the sensor unit to the fluid temperature measuring element.

According to another aspect of the present invention, there is provided a flow rate sensor comprising: a measuring duct, having a cylindrical shape, arranged within a path of a fluid to be measured with the axial direction thereof substantially in alignment with the flow direction of the fluid to be measured; a thermosensitive flow rate detecting element comprising a flat substrate provided with a gap having an opening on at least one side, an insulating support film provided on one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on the one side of the flat substrate, for detecting temperature of the fluid, and a notch provided on the flat substrate near the fluid temperature measuring element and formed by removing a part of the flat substrate from either side of the flat substrate so as not to reach the remaining side thereof; the thermosensitive flow rate detecting element being provided in the measuring duct with the arranging direction of the heating element and the thermosensitive element in alignment with the axial direction of the measuring duct; and a control unit for controlling electric current supplied to the heating resistance element so as to keep the temperature of the heating resistance element at a prescribed value higher than the temperature of the fluid temperature measuring element; whereby a flow rate or a flow velocity of the fluid being measured on the basis of thermal conduction phenomenon from the portion heated by the heating resistance element to the fluid to be measured.

DETAILED DESCRIPTION OF THE PREFERRED EMBODIMENTS

Now, the first embodiment of the present invention will be described below.

First Embodiment

Figure 1:
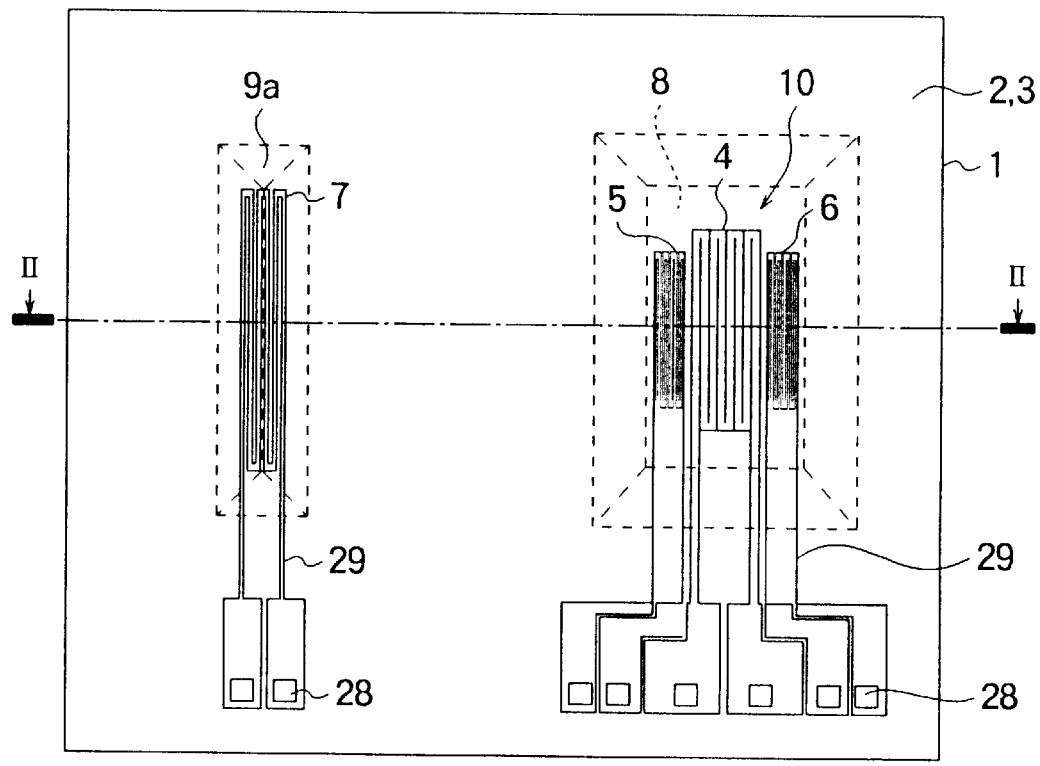
FIG. 1 is a plan view illustrating a thermosensitive flow rate detecting element of a first embodiment of the invention.
Figure 2:
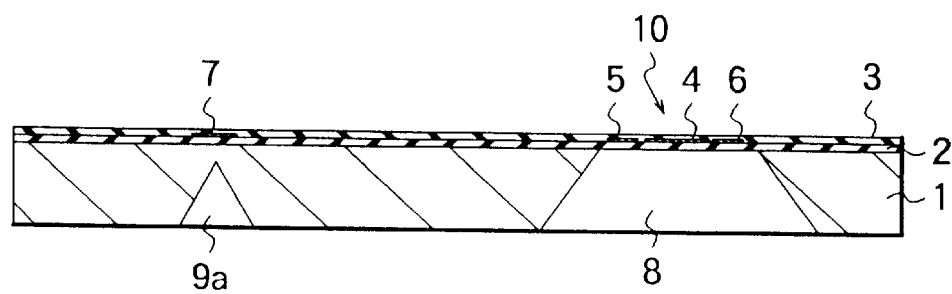
FIG. 2 is a sectional view of FIG. 1 cut along the line II—II.

FIG. 1 is a plan view illustrating a flow rate detecting element of a first embodiment of the invention; and FIG. 2 is a sectional view of FIG. 1 cut along the line II—II.

In FIGS. 1 and 2, an insulating support film 2 is formed on the surface of a flat substrate 1, and a lattice-shaped heating resistance element 4 serving as a heating element is formed on the support film 2. Lattice-shaped thermoresistance elements 5 and 6 serving as thermosensitive elements are formed on the support film 2 so as to be positioned on the both sides of the heating resistance element 4. Further, an insulating protecting film 3 is formed on the support film 2 so as to cover the heating resistance element 4 and the pair of thermoresistance elements 5 and 6. The heating resistance 4 and the pair of thermoresistance elements 5 and 6, as wrapped by the support film 2 and the protecting film 3, form a sensor unit 10. The sensor unit 10 is formed symmetrically relative to the center of the heating resistance element 4.

An etching hole 8 serving as a gap is provided below the sensor unit 10 of the flat substrate 1. The etching hole 8 is formed by applying alkali etching with, for example, a photo-resist (not shown) formed on the back of the flat substrate 1 as a mask, and thus removing a part of the flat substrate 1 so as to reach the support film 2. The sensor unit 10, supported by the flat substrate 1 over the entire periphery thereof, forms a diaphragm, and is in a non-contact state with the flat substrate 1.

A lattice-shaped fluid temperature measuring element 7 is formed on the support film 2 at a certain distance from the sensor unit 10, and is covered by the protecting film 3 from above. A notch 9a serving as a first notch is provided on the flat substrate 1 near the fluid temperature measuring element 7, i.e., below the fluid temperature measuring element 7. The notch 9a is formed by applying alkali etching with, for example, a photo-resist (not shown) formed on the back of the flat substrate as a mask, and removing a part of the flat substrate so as not to reach the protecting film 2. Further, conductive ducts 29 extend from individual ends of lattice-shaped patterns of the fluid temperature measuring element 7, the heating resistance element 4 and the pair of thermoresistance elements 5 and 6, and an electrode terminal 28 is formed by removing the protecting film 3 on the end of each conductive duct 29.

The flat substrate 1 is made of a semiconductor, and particularly, of silicon which permits application of a highly precise etching technology and ensures a high chip productivity. The support film 2 and the protecting film 3 are made of silicon nitride which is a very excellent thermal insulator. The heating resistance element 4, thermoresistance elements 5 and 6, and the fluid temperature measuring element 7 are made of platinum.

Preparation of this flow rate detecting element comprises the steps of first forming a 2 μm-thick film of silicon nitride by a film forming method such as sputtering, vacuum vapor deposition or CVD to one entire surface of the flat substrate 1 comprising silicon, thereby forming the support film 2. Then, the subsequent steps comprise forming a 0.2 μm-thick platinum film by sputtering or vacuum vapor deposition on the entire surface of the support film 2, patterning the platinum film by the photoengraving and etching techniques, thereby forming a lattice-shaped heating resistance element 4, thermoresistance elements 5 and 6 and a fluid temperature measuring element 7 having a pattern width of 5 μm and a pattern interval of 5 μm. Then, a 2 μm-thick film of silicon nitride is formed on the entire surface of the support film 2 by a film forming method such as sputtering, vacuum vapor deposition or CVD, thereby forming a protecting film 3. Subsequently, the protecting film 3 is removed from ends of the conductive ducts 29 of the heating resistance element 4, the thermoresistance elements 5 and 6 and the fluid temperature measuring element 7 by the application of the photoengraving and the etching techniques to form electrode terminals 28.

A rectangular opening is formed by coating a photo-resist to the ensure surface of the other side (back surface) of the flat substrate 1, removing the photo-resist so as to cover the arranging regions of the sensor unit 10 and the fluid temperature measuring element 7 by photoengraving and etching techniques. Then, after forming an etching hole 8 and a notch 9a by etching the flat substrate 1 from this opening, the photo-resist is removed, resulting in a flow rate detecting element as shown in FIGS. 1 and 2.

The etching depth can be controlled by means of the size of the rectangular opening formed in the photo-resist. Because the opening provided below the arranging region of the fluid temperature measuring element 7 has a smaller size than that of the opening provided below the arranging region of the sensor unit 10, the notch 9a not reaching the support film 2 is formed simultaneously with formation of the etching hole 8 reaching the support film 2.

Figure 25:
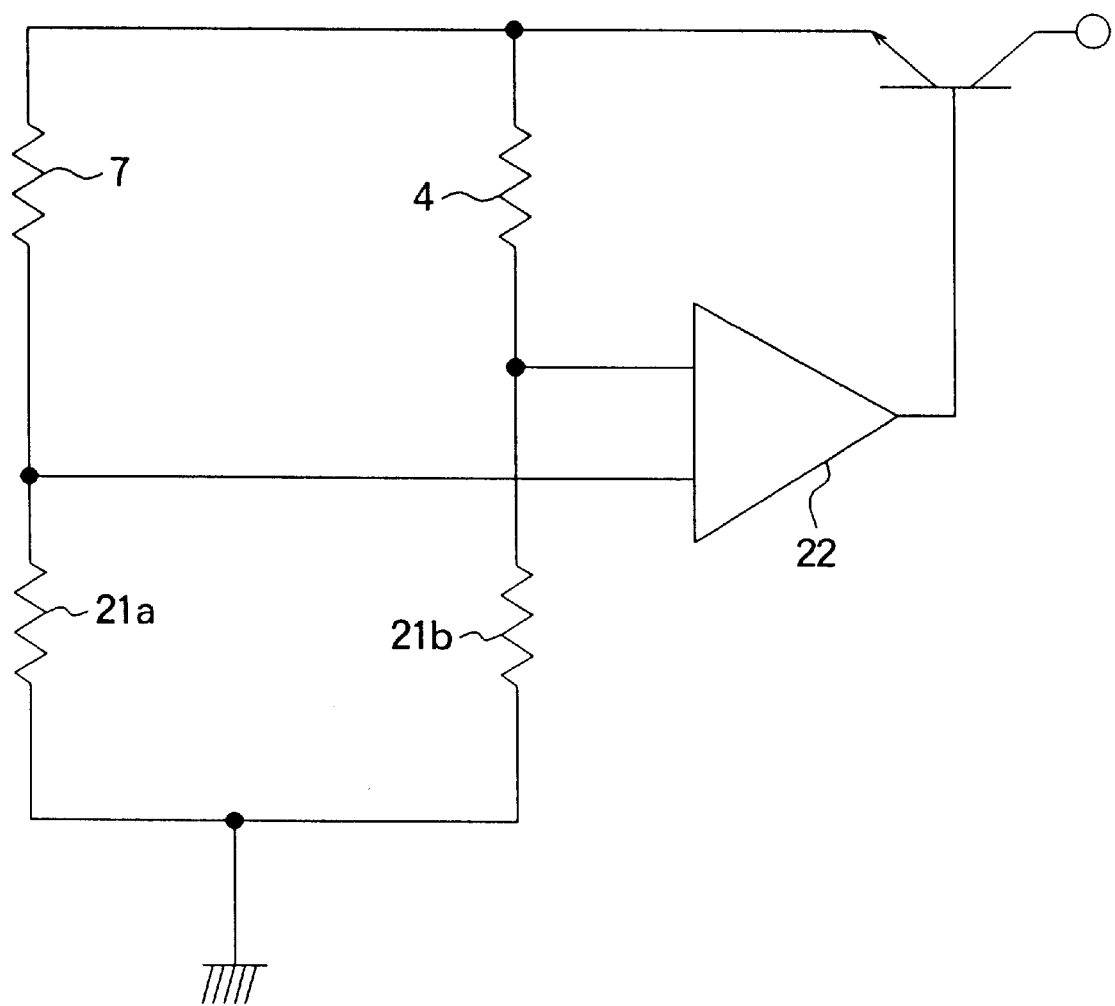
FIG. 25 is a diagram of a control circuit of the thermosensitive flow rate detecting element.

In the flow rate detecting element configured as described above, heating current fed to the heating resistance element 4 is controlled by a control circuit shown in FIG. 25 so that temperature of the heating resistance element 4 is kept higher by, for example, 200C than temperature of the flat substrate detected by the fluid temperature measuring element 7. Because of the presence of the etching hole 8 below the sensor unit 10, heat produced at the heating resistance element 4 is not transmitted to the fluid temperature measuring element 7. Temperature detected by the fluid temperature measuring element 7 thus becomes substantially equal to the environmental temperature (temperature of the fluid to be measured passing on the fluid temperature measuring element 7). A higher flow-velocity of the measured fluid flowing on the protecting film 4 side leads to a change in the temperature distribution comprising a lower temperature in the upstream, and a higher temperature in the downstream.

A certain voltage is previously applied to each of the thermoresistance elements 5 and 6 through electrode terminals 28 by means of a circuit (not shown), and current values of current flowing to the thermoresistance elements 5 and 6 are measured, respectively. The flow direction, flow rate or flow velocity of air can thus be measured by comparing these current values. Quantities corresponding to temperature of the thermoresistance elements 5 and 6, respectively, are measured by a method comprising previously feeding a certain current to each of the thermoresistance elements 5 and 6, and measuring voltage between the electrode terminals 28 or by a method comprising measuring power consumption of each of the thermoresistance elements 5 and 6. It is possible to measure the flow direction, flow rate or flow velocity of air by comparing these quantities.

In the first embodiment, as described above, the notch 9a is provided by removing a part of the flat substrate 1 from the back side toward the support film 2 so as not to reach the support film 2 on the flat substrate 1 under the arranging region of the fluid temperature measuring element 7.

This reduces the heat capacity of the arranging portion of the fluid temperature measuring element 7, thus permitting improvement of response of the fluid temperature measuring element 7 to a change in fluid temperature. As a result, it is possible to prevent a delay in temperature control of the heating resistance element 4 caused by a delay in response to a change in fluid temperature of the fluid temperature measuring element 7.

Even upon a sudden change in temperature of the measured fluid, therefore, temperature of the measured fluid is rapidly detected by the fluid temperature measuring element 7, and it is possible to rapidly control temperature of the heating resistance element 4 to a level higher by 200C than temperature of the measured fluid and thus to obtain a flow rate detecting element having a high response.

There is available a high strength of the arranging portion of the fluid temperature measuring element 7 and a flow rate detecting element excellent in reliability.

Second Embodiment

Figure 3:
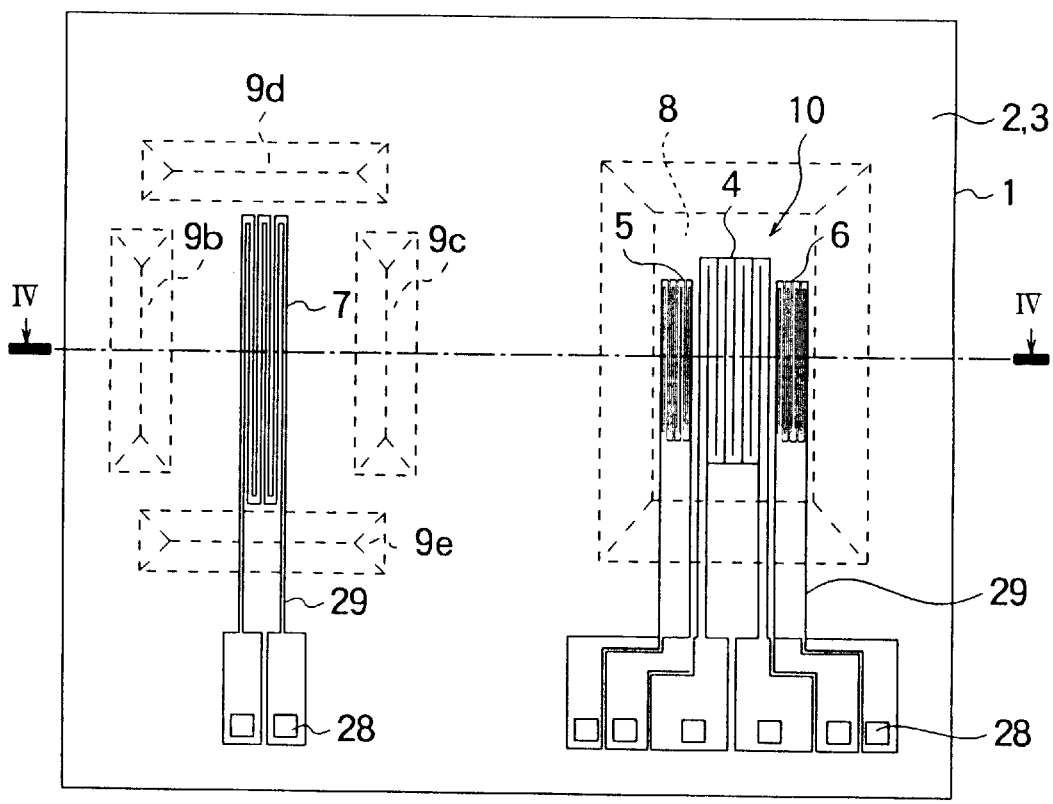
FIG. 3 is a plan view illustrating a thermosensitive flow rate detecting element of a second embodiment of the invention.
Figure 4:
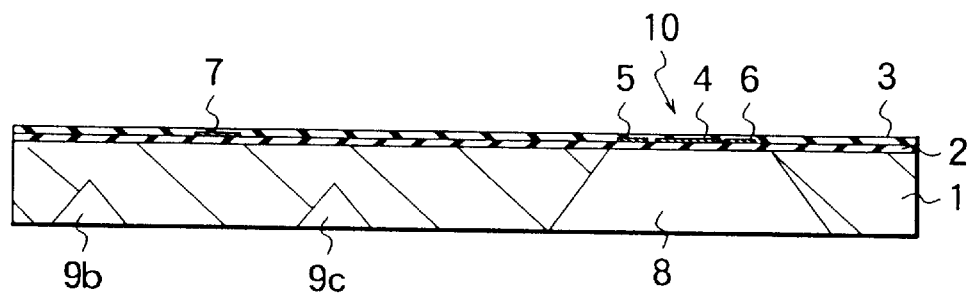
FIG. 4 is a sectional view of FIG. 3 cut along the line IV—IV.

FIG. 3 is a plan view illustrating a flow rate detecting element of a second embodiment of the invention; and FIG. 4 is a sectional view of FIG. 3 cut along the line IV—IV.

In this second embodiment, notches 9b, 9c, 9d and 9e serving as the first notches formed from the back side of the flat substrate 1 so as not to reach the support film 2 is provided in the flat substrate 1 so as to surround the fluid temperature measuring element 7 near the fluid temperature measuring element 7, i.e., on the outer periphery of the arranging region of the fluid temperature measuring element 7.

The second embodiment has the same configuration as that in the foregoing first embodiment except that, in place of the notch located directly under the arranging region of the fluid temperature measuring element 7, the four notches 9b, 9c, 9d and 9e are arranged so as to surround the fluid temperature measuring element 7 on the outer periphery of the arranging region of the fluid temperature measuring element 7.

In the flow rate detecting element having the configuration as described above, the four notches 9b, 9c, 9d and 9e are provided around the fluid temperature measuring element 7 so as to surround the fluid temperature measuring element 7. The thickness of the portion of the flat substrate 1 provided with these notches 9b, 9c, 9d and 9e is reduced and thermoresistance at this portion increases, thus thermally separating the fluid temperature measuring element 7 from the outer periphery. As a result, the heat capacity of the arranging portion of the fluid temperature measuring element is reduced.

In this embodiment, heat conducted to the fluid temperature measuring element 7 is affected by the flat substrate 1 having a high thermal conductivity. However, because the heat capacity of the arranging portion of the fluid temperature measuring element 7 is reduced, it is possible to improve response of the fluid temperature measuring element 7 to a change in fluid temperature.

According to the second embodiment, as described above, in which the four notches 9b, 9c, 9d and 9e formed from the back surface of the flat substrate 1 so as not to reach the support film 2 are located so as to surround the fluid temperature measuring element 7, the heat capacity of the arranging portion of the fluid temperature measuring element 7 is reduced, thus improving response of the fluid temperature measuring element 7 to a change in fluid temperature.

As a result, even upon a sudden change in temperature of the measured fluid, temperature of the measured fluid is rapidly detected by the fluid temperature measuring element 7, and temperature of the heating resistance element 4 is controlled to a level higher by 200C than temperature of the measured fluid, thus giving a flow rate detecting element of a good response.

As compared with the conventional flow rate detecting element, the arranging portion of the fluid temperature measuring element 7 has a higher strength, thus making it possible to obtain a flow rate detecting element excellent in reliability.

Third Embodiment

Figure 5:
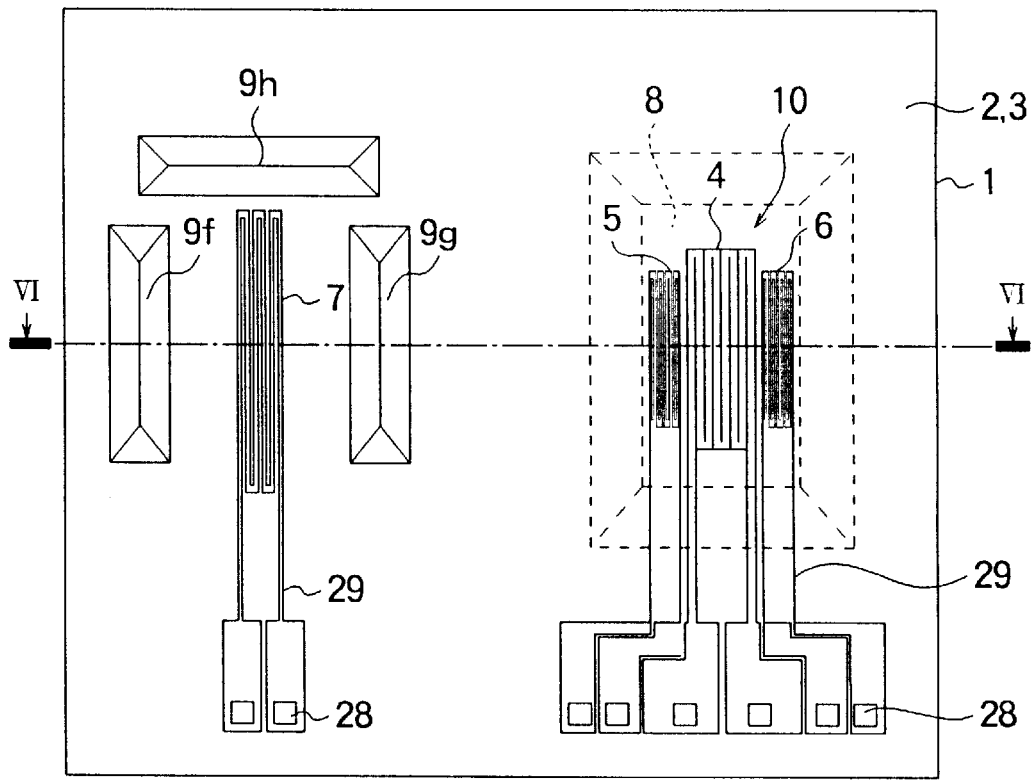
FIG. 5 is a plan view illustrating a thermosensitive flow rate detecting element of a third embodiment of the invention.
Figure 6:
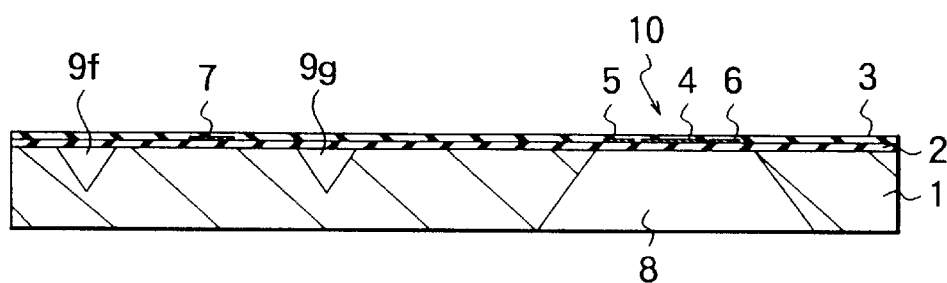
FIG. 6 is a sectional view of FIG. 5 cut along the line VI—VI.

FIG. 5 is a plan view illustrating a flow rate detecting element of a third embodiment of the invention; and FIG. 6 is a sectional view of FIG. 5 cut along the line VI—VI.

In this third embodiment, three notches 9f, 9g and 9h as the first notches formed from the main surface of the flat substrate 1 by passing through the support film 2 and the protecting film 3 so as not to reach the back surface of the flat substrate 1 are provided near the fluid temperature measuring element 7, i.e., on the outer periphery of the arranging region of the fluid temperature measuring element 7 so as to surround the fluid temperature measuring element 7.

The third embodiment has the same configuration as that in the foregoing first embodiment in terms of all the other aspects.

In the flow rate detecting element having the configuration as described above, the three notches 9f, 9g and 9h formed from the surface of the flat substrate 1 so as not to reach the back surface are located on the outer periphery of the fluid temperature measuring element 7 so as to surround the fluid temperature measuring element 7. The heat capacity of the arranging portion of the fluid temperature measuring element 7 is therefore reduced, and response of the fluid temperature measuring element 7 to a change in fluid temperature is improved.

In this third embodiment as well, therefore, there are available the same effects as in the foregoing second embodiment.

Fourth Embodiment

Figure 7:
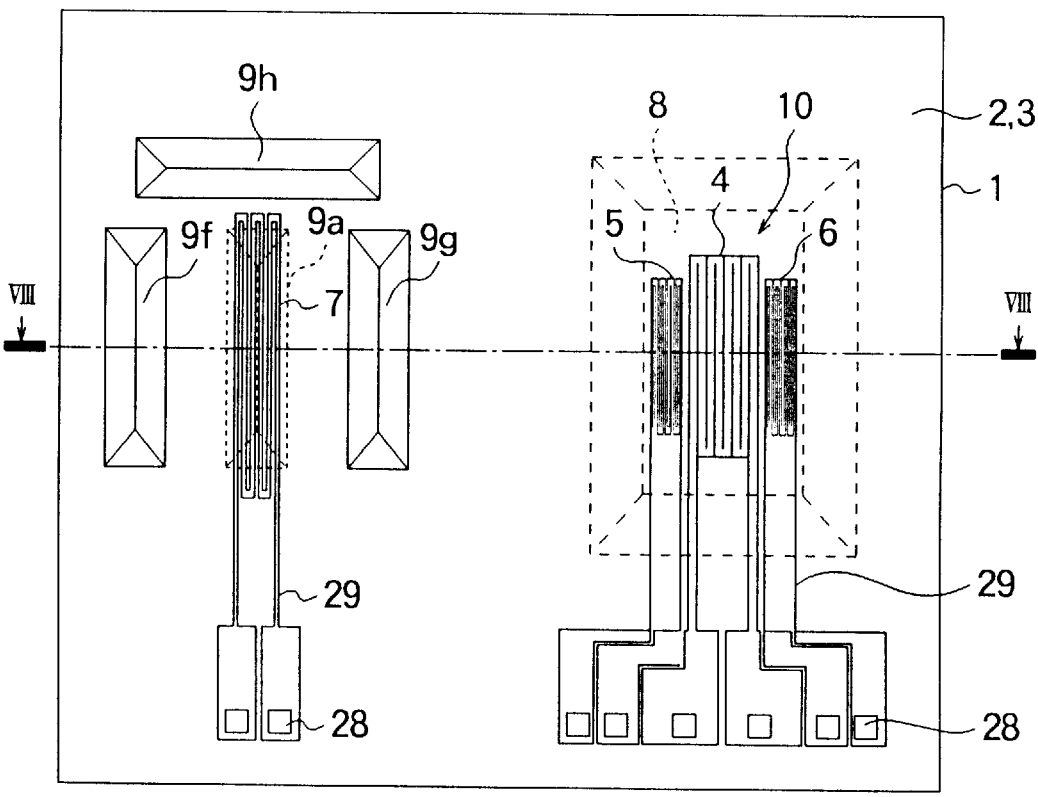
FIG. 7 is a plan view illustrating a thermosensitive flow rate detecting element of a fourth embodiment of the invention.
Figure 8:
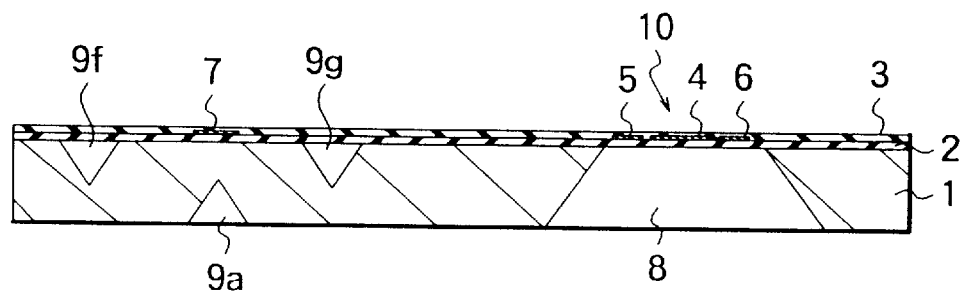
FIG. 8 is a sectional view of FIG. 7 cut along the line VIII—VIII.

FIG. 7 is a plan view illustrating a flow rate detecting element of a fourth embodiment of the invention;

and FIG. 8 is a sectional view of FIG. 7 cut along the line VIII—VIII.

In this fourth embodiment, a notch 9a formed from the back surface of the flat substrate 1 so as not to reach the support film 2 is provided under the arranging region of the fluid temperature measuring element 7, and further, three notches 9f, 9g and 9h formed from the surface of the flat substrate 1 by passing through the support film 2 and the protecting film 3 so as not to reach the back of the flat substrate 1 are provided around the arranging region of the fluid temperature measuring element 7.

According to this fourth embodiment, as compared with the foregoing first or third embodiment, the heat capacity of the arranging portion of the fluid temperature measuring element 7 is further reduced, thus making it possible to so much improve response of the fluid temperature measuring element 7 to a change in fluid temperature.

While provision of a plurality of notches may lead to a decrease in strength, control of the etching depth permits inhibition of the decrease in strength and ensures a sufficient reliability in strength.

In this fourth embodiment, furthermore, having a configuration based on the combination of the foregoing first and third embodiments. A configuration based on the combination of the foregoing first and second embodiments can also give the same effects.

Fifth Embodiment

Figure 9:
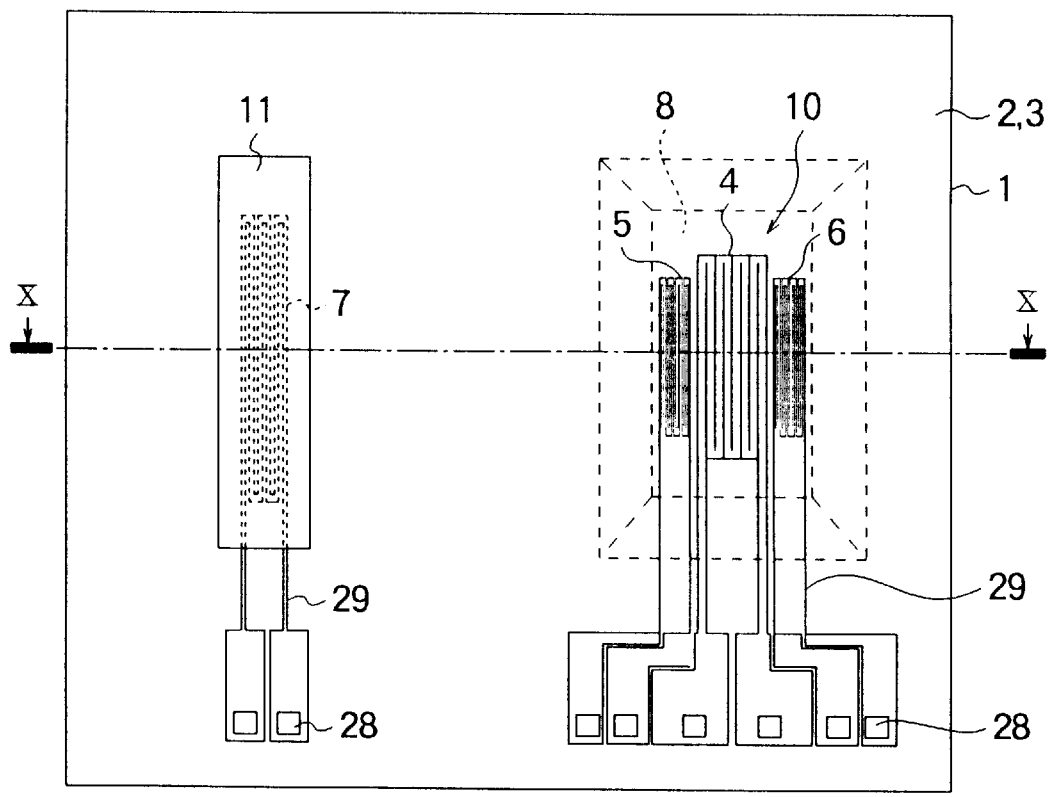
FIG. 9 is a plan view illustrating a thermosensitive flow rate detecting element of a fifth embodiment of the invention.
Figure 10:
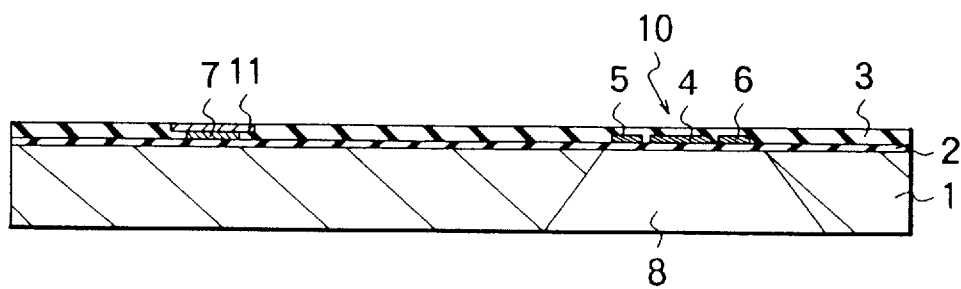
FIG. 10 is a sectional view of FIG. 9 cut along the line X—X.

FIG. 9 is a plan view illustrating a flow rate detecting element of a fifth embodiment of the invention; and FIG. 10 is a sectional view of FIG. 9 cut along the line X—X.

In this fifth embodiment, a metallic film 11 serving as a thin film comprising a high-thermal-conductivity material is provided on the fluid temperature measuring element 7 in a state electrically insulated therefrom.

The fifth embodiment has the same configuration as in the foregoing first embodiment except that a notch 9a is not provided, and the metallic film 11 is provided on the fluid temperature measuring element 7.

Preparation of the flow rate detecting element according to the fifth embodiment comprises the steps of first forming a fluid temperature measuring element 7 on a support film 2, then, sequentially forming a silicon nitride film and an Al film thereon, etching the Al film in a rectangular shape so as to cover the fluid temperature measuring element 7 by the application of photoengraving and etching techniques to form a metallic film 11, then, removing the photo-resist serving as a mask for etching the Al film, and forming a silicon nitride film thereon to form a protecting film 3. There is thus available a flow rate detecting element in which the metallic film 11 covers the fluid temperature measuring element 7 and is electrically insulated therefrom in a state built in the protecting film 3.

In the flow rate detecting element having the configuration as described above, the metallic film 11 having a high thermal conductivity is provided on the fluid temperature measuring element 7, thus permitting reduction of thermal resistance of the fluid temperature measuring element 7. As a result, it is possible to improve response of the arranging portion of the fluid temperature measuring element 7 to a change in fluid temperature.

Because no notch is provided near the fluid temperature measuring element 7, it is possible to increase strength of the fluid temperature measuring element 7.

According to the fifth embodiment, as described above, even upon a sudden change in temperature of the measured fluid, temperature of the measured fluid is rapidly detected by the fluid temperature measuring element 7, and temperature of the heating resistance element 4 is controlled to a level higher by 200C than temperature of the measured fluid. There is therefore available a flow rate detecting element excellent in response and reliability.

In the flow rate detecting element of the fifth embodiment, a notch may be provided near the fluid temperature measuring element 7. Provision of a notch permits reduction of the heat capacity of the arranging portion of the fluid temperature measuring element 7 and improvement of thermal response thereof.

In the fifth embodiment, the metallic film 11 comprising Al is used as a high-thermal-conductivity material. The material of a high thermal conductivity is not however limited to Al, but a material having a thermal conductivity higher than that of the support film 2 and the protecting film 3 may be used, including, for example, Cu, Ag, Pt, AlSi, and TiN.

Sixth Embodiment

Figure 11:
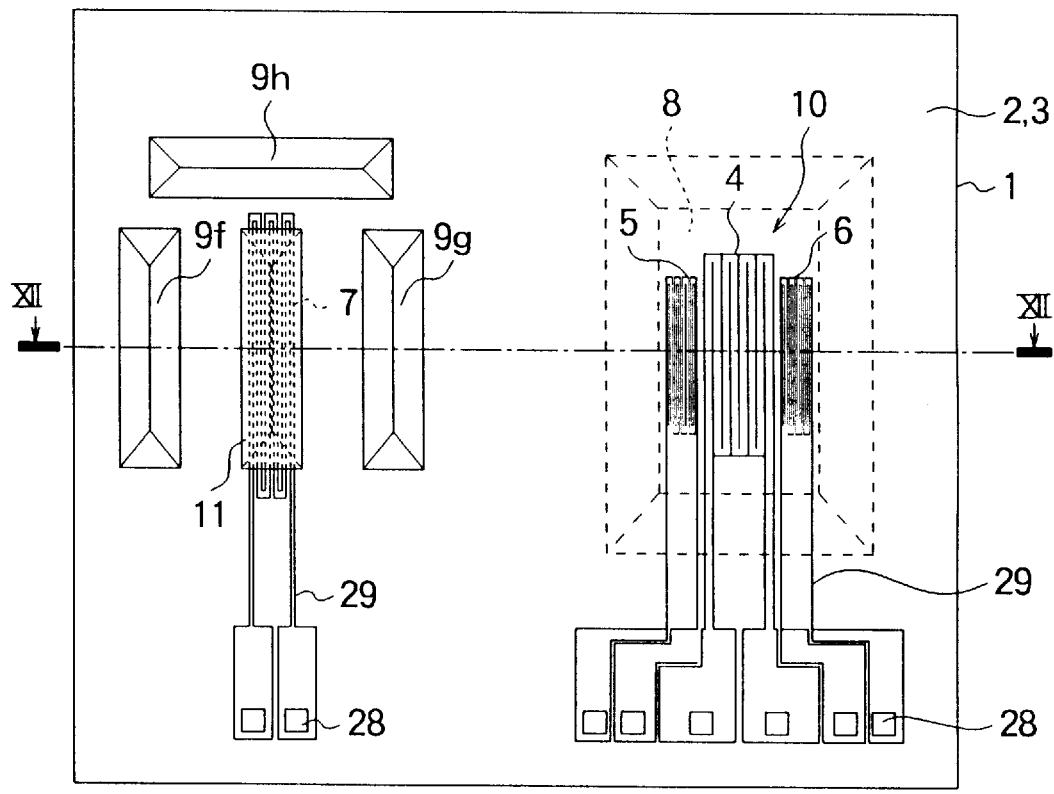
FIG. 11 is a plan view illustrating a thermosensitive flow rate detecting element of a sixth embodiment of the invention.
Figure 12:
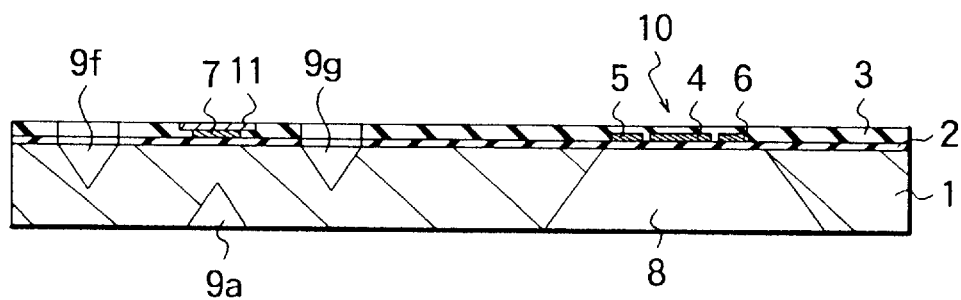
FIG. 12 is a sectional view of FIG. 11 cut along the line XII—XII.

FIG. 11 is a plan view illustrating a flow rate detecting element of a sixth embodiment of the invention; and FIG. 12 is a sectional view of FIG. 11 cut along the line XII—XII.

In this sixth embodiment, a notch 9a is provided under the arrangement region of the fluid temperature measuring element 7 from the back of the flat substrate 1 so as not to reach the support film 2. Further, three notches 9f, 9g and 9h are provided from the surface of the flat substrate 1 by passing through the support film 2 and the protecting film 3 so as not to reach the back of the flat substrate 1 on the outer periphery of the arranging region of the fluid temperature measuring element 7, surrounding the fluid temperature measuring element 7. In addition, a metallic film 11 comprising Al is provided on the fluid temperature measuring element 7 in a state electrically insulted therefrom.

The sixth embodiment has the same configuration as that in the foregoing fifth embodiment except that the notches 9a, 9f, 9g and 9h are provided near the fluid temperature measuring element 7.

In the flow rate detecting element having the configuration as described above, in which the metallic film 11 high in thermal conductivity is provided on the fluid temperature measuring element 7, it is possible to reduce thermal resistance of the arranging portion of the fluid temperature measuring element 7. Further, because the notches 9a, 9f, 9g and 9h are provided near the fluid temperature measuring element 7, the heat capacity of the arranging portion of the fluid temperature measuring element 7 can be reduced. As a result, it is possible to improve response of the fluid temperature measuring element 7 to a change in fluid temperature.

According to the sixth embodiment, as described above, even upon a sudden change in temperature of the measured fluid, temperature of the measured fluid is rapidly detected by the fluid temperature measuring element 7, and temperature of the heating resistance element 4 is controlled to a level higher by 200C than temperature of the measured fluid. There is therefore available a flow rate detecting element excellent in response and reliability.

Seventh Embodiment

Figure 13:
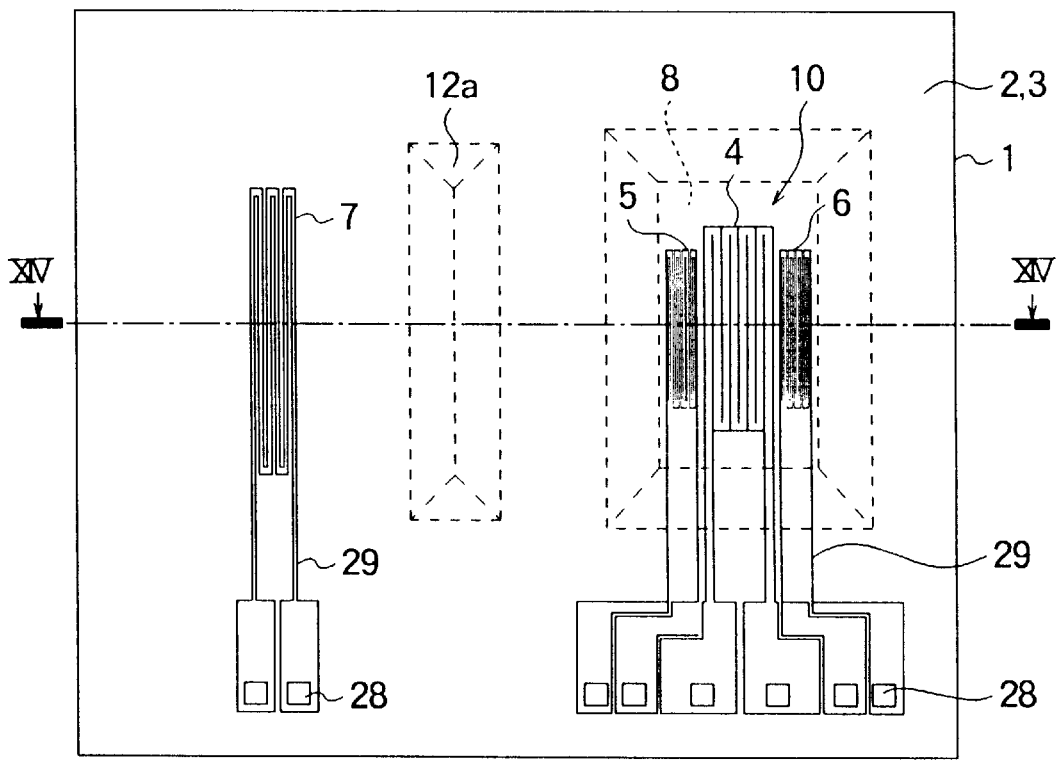
FIG. 13 is a plan view illustrating a thermosensitive flow rate detecting element of a seventh embodiment of the invention.
Figure 14:
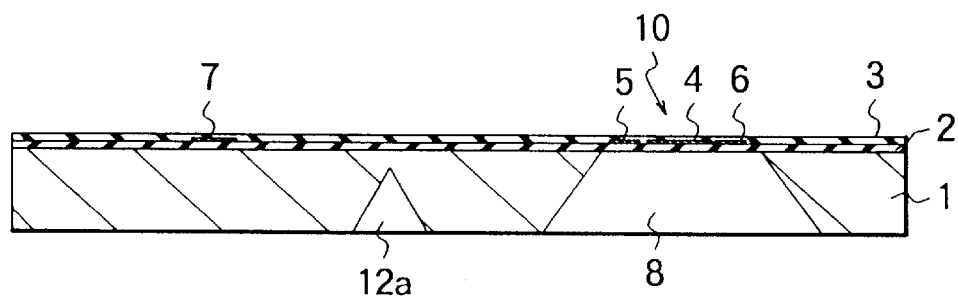
FIG. 14 is a sectional view of FIG. 13 cut along the line XIV—XIV.

FIG. 13 is a plan view illustrating a flow rate detecting element of a seventh embodiment of the invention; and FIG. 14 is a sectional view of FIG. 13 cut along the line XIV—XIV.

In this seventh embodiment, a notch 12a serving as a second notch is provided at a position between the sensor unit 10 and a fluid temperature measuring element 7 from the back of the substrate 1 so as not to reach a support film 2. The notch 12a provided so as to cross a thermal conduction path from the sensor unit 10 to the fluid temperature measuring element 7.

The seventh embodiment has the same configuration as that in the foregoing first embodiment except that a notch 12a is provided in place of the notch 9a.

In the flow rate detecting element having the configuration as described above, the notch 12a is provided so as to cross the thermal conduction path from the sensor unit 10 to the fluid temperature measuring element 7. The thickness of the flat substrate 1 at the portion having the notch 12a becomes therefore smaller, with an increased thermal resistance. The thermal conduction path from the sensor unit 10 to the fluid temperature measuring element 7 has an increased surface area, so that the heat conducted from the sensor unit 10 through the flat substrate 1 is released from the surface of the notch 12a. As a result, heat conducted from the sensor unit 10 through the flat substrate 1 to the fluid temperature measuring element 7 is reduced.

According to the seventh embodiment, as described above, in which the notch 12a is provided in the thermal conduction path, temperature of the fluid temperature measuring element 7 is never affected by heat generated in the heating resistance element 4, and it is therefore possible to bring the fluid temperature measuring element 7 closer to the sensor unit 10. There is therefore available a downsized flow rate detecting element.

Eighth Embodiment

Figure 15:
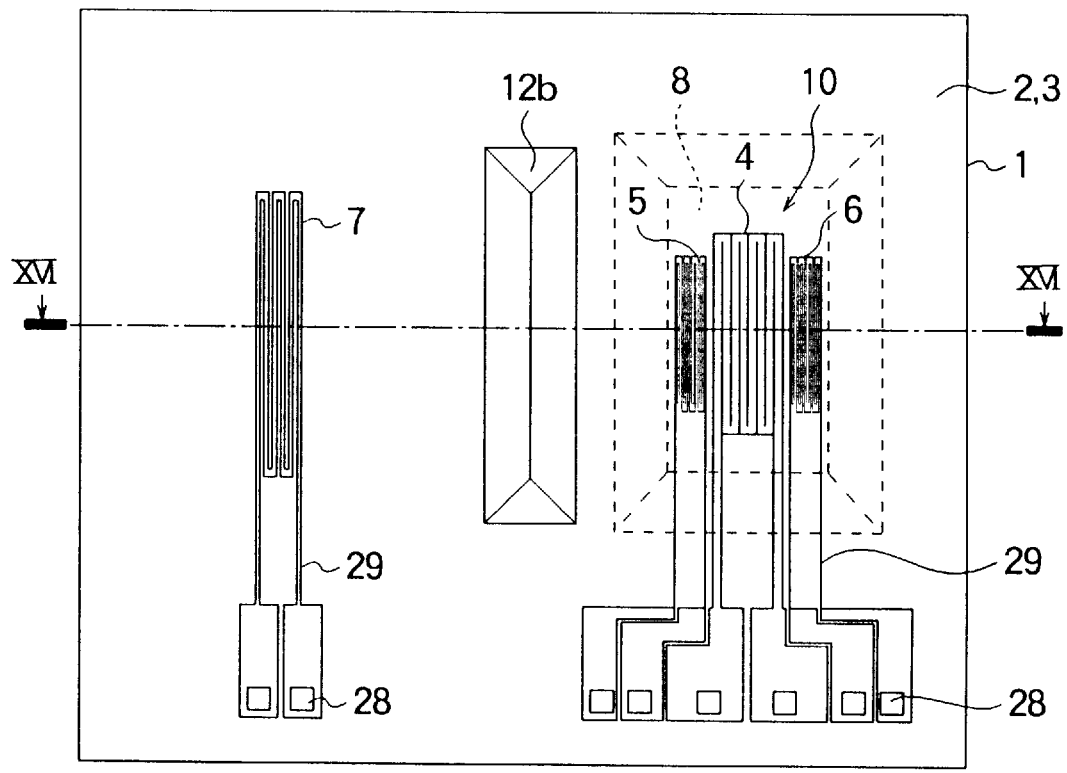
FIG. 15 is a plan view illustrating a thermosensitive flow rate detecting element of an eighth embodiment of the invention.
Figure 16:
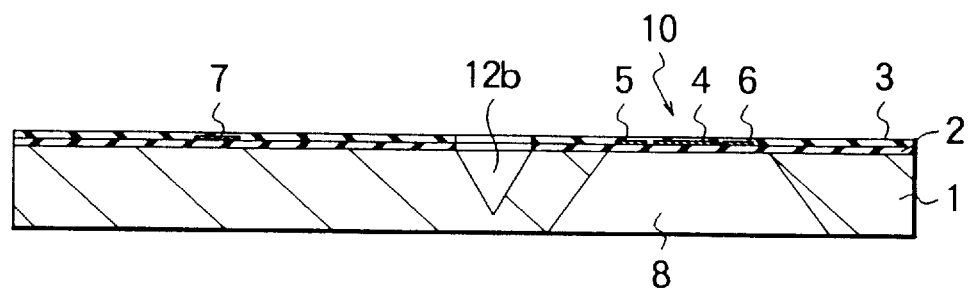
FIG. 16 is a sectional view of FIG. 15 cut along the line XVI—XVI.

FIG. 15 is a plan view illustrating a flow rate detecting element of an eighth embodiment of the invention; and FIG. 16 is a sectional view of FIG. 15 cut along the line XVI—XVI.

In this eighth embodiment, a notch 12b serving as a second notch is provided at a position between a sensor unit 10 and a fluid temperature measuring element 7, from the surface of a flat substrate 1 by passing through a support film 2 and a protecting film 3 so as not to reach the back surface. This notch 12b is provided so as to cross the thermal conduction path from the sensor unit 10 to the fluid temperature measuring element 7.

The eighth embodiment has the same configuration as that of the foregoing seventh embodiment except that the notch 12b is provided in place of the notch 12a.

In the flow rate detecting element having the configuration as described above, the notch 12b is provided so as to cross the thermal conduction path from the sensor unit 10 to the fluid temperature measuring element 7. The thickness of the flat substrate 1 at the portion provided with the notch 12b becomes therefore smaller, with an increased thermal resistance. The surface area of the thermal conduction path from the sensor unit 10 to the fluid temperature measuring element 7 increases, and heat conducted from the sensor unit 10 through the flat substrate 1 is released from the surface of the notch 12b. Further, because the notch 12b is provided from the surface side of the flat substrate 1, heat conducted from the sensor unit 10 to the fluid temperature measuring element 7 by-passes the notch 12b, thus leading to a longer thermal conduction path. As a result, heat conducted from the sensor unit 10 through the flat substrate 1 to the fluid temperature measuring element 7 is reduced.

According to the eighth embodiment, as described above, in which the notch 12b is provided in the thermal conduction path, temperature of the fluid temperature measuring element 7 is never affected by heat generated in the heating resistance element 4, and it is therefore possible to bring the fluid temperature measuring element 7 closer to the sensor unit 10. There is therefore available a downsized flow rate detecting element.

Ninth Embodiment

Figure 17:
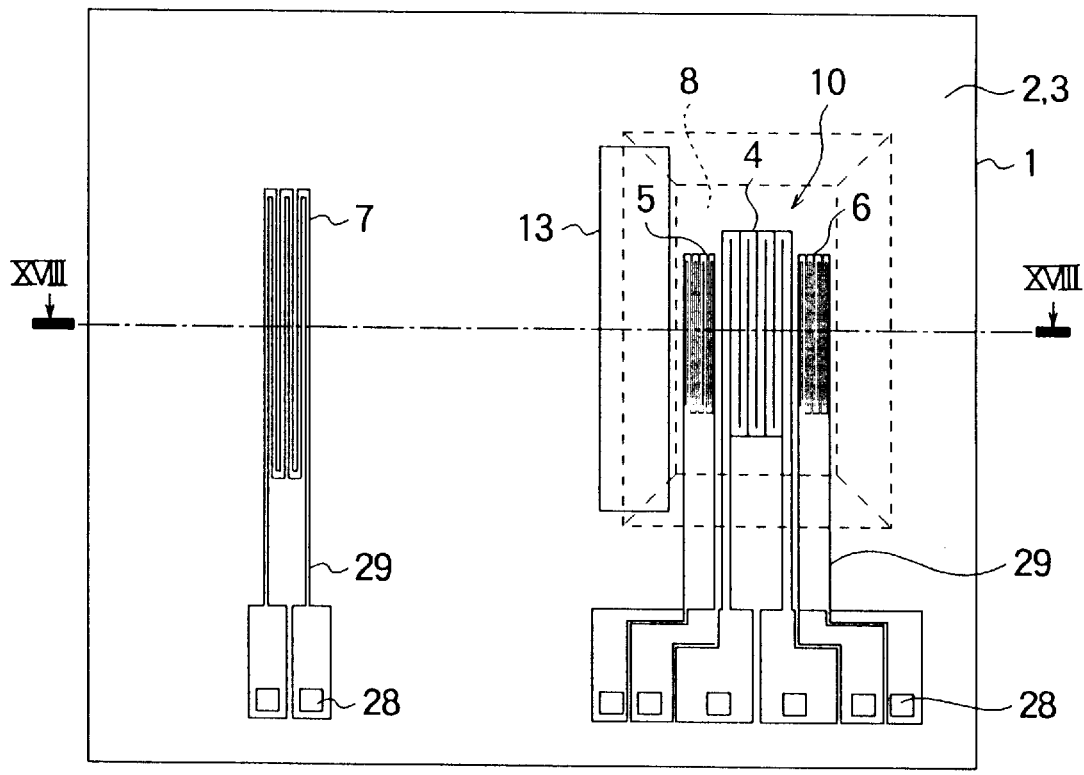
FIG. 17 is a plan view illustrating a thermosensitive flow rate detecting element of a ninth embodiment of the invention.
Figure 18:
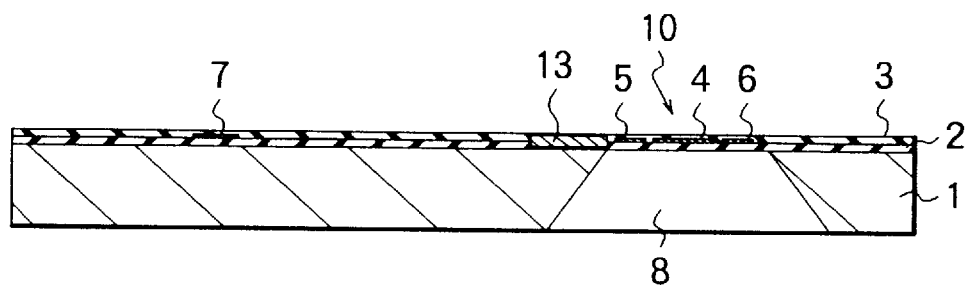
FIG. 18 is a sectional view of FIG. 17 cut along the line XVIII—XVIII.

FIG. 17 is a plan view illustrating a flow rate detecting element of a ninth embodiment of the invention; and FIG. 18 is a sectional view of FIG. 17 cut along the line XVIII—XVIII.

In this ninth embodiment, a thermal conduction inhibiting member 13 built in an insulating film comprising a support film 2 and a protecting film 3 is provided at a position between a sensor unit 10 and a fluid temperature measuring element 7. The thermal conduction inhibiting member 13 is provided so as to cross a thermal conduction path from the sensor unit 10 to the fluid temperature measuring element 7. The thermal conduction inhibiting member 13 is made of a material having a thermal conductivity lower than that of the support film 2 and the protecting film 3 such as a photoresist, polyimide and glass (PSG, BPSG), and is film-formed by spin-coating or CVD.

The ninth embodiment has the same configuration as that in the foregoing seventh embodiment 7 except that the thermal conduction inhibiting member 13 is provided in place of the notch 12a.

In the flow rate detecting element having the configuration as described above, the thermal conduction inhibiting member 13 is provided so as to cross the thermal conduction path of the insulating film comprising the support film 2 and the protecting film 3 from the sensor unit 10 to the fluid temperature measuring element 7. Thus, thermal resistance of the thermal conduction path of the insulating film comprising the support film 2 and the protecting film 3 is increased, and heat conducted from the sensor unit 10 through the flat substrate 1 to the fluid temperature measuring element 7 is reduced.

According to the ninth embodiment, as described above, in which the thermal conduction inhibiting member 13 is provided in the thermal conduction path of the insulating film comprising the support film 2 and the protecting film 3, temperature of the fluid temperature measuring element 7 is not affected by the heat generated in the heating resistance element 4, the position of the fluid temperature measuring element 7 can be brought closer to the sensor unit 10. There is therefore available a downsized flow rate detecting element.

Tenth Embodiment

Figure 19:
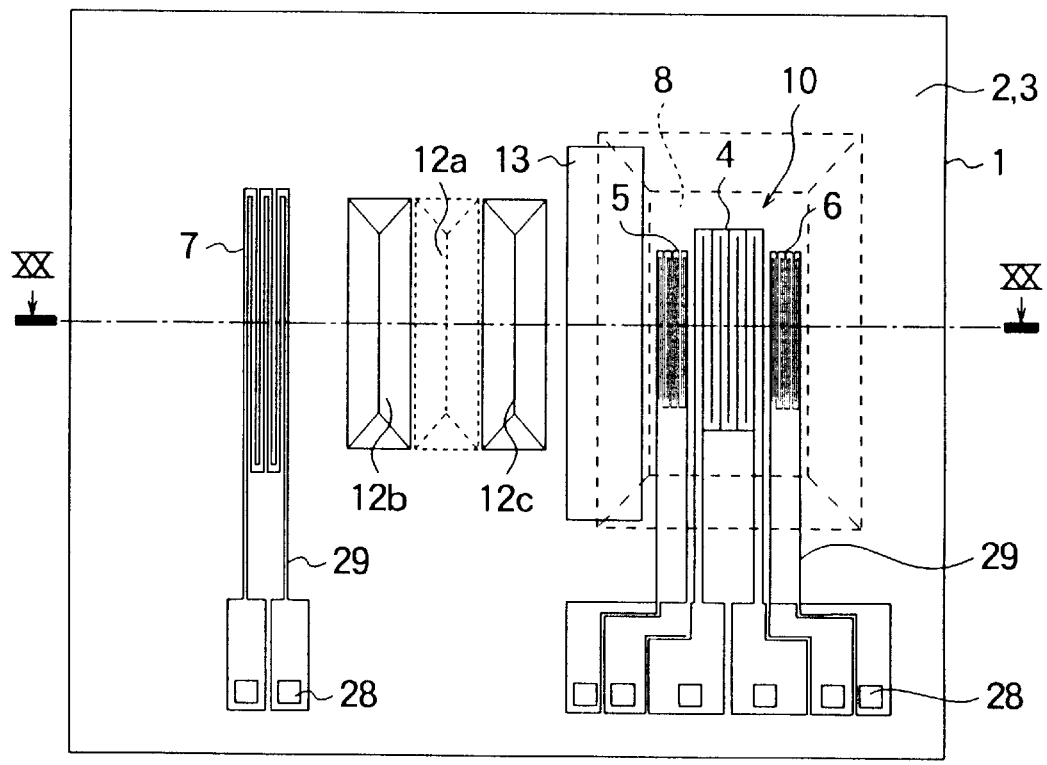
FIG. 19 is a plan view illustrating a thermosensitive flow rate detecting element of a tenth embodiment of the invention.
Figure 20:
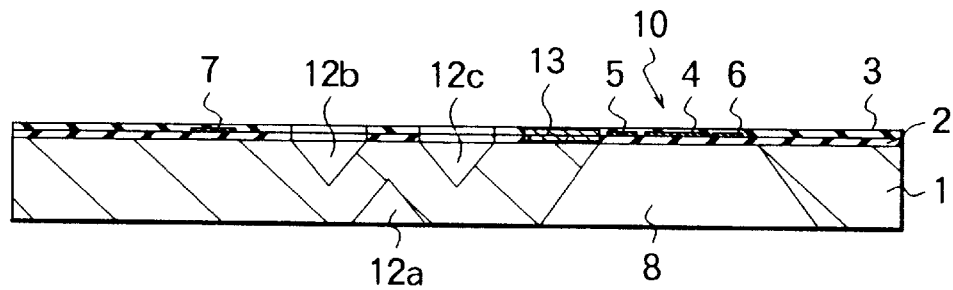
FIG. 20 is a sectional view of FIG. 19 cut along the line XX—XX.

FIG. 19 is a plan view illustrating a flow rate detecting element of a tenth embodiment of the invention; and FIG. 20 is a sectional view of FIG. 19 cut along the line XX—XX.

In this tenth embodiment, a thermal conduction inhibiting member 13 built in an insulating film comprising a support film 2 and a protecting film 3 is provided at a position between a sensor unit 10 and a fluid temperature measuring element 7. A notch 12a is provided at a position between the sensor unit 10 and the fluid temperature measuring element 7 from the back of the flat substrate 1 so as not to reach the support film 2. Further, two notches 12b and 12c are provided at positions between the sensor unit 10 and the fluid temperature measuring element 7 from the surface of the flat substrate 1 by passing through the support film 2 and the protecting film 3 so as not to reach the back of the flat substrate 1.

The thermal conduction inhibiting member 13 and the notches 12a, 12b and 12c are provided so as to cross a thermal conduction path from the sensor unit 10 to the fluid temperature measuring element 7.

The tenth embodiment has the same configuration as that of the foregoing ninth embodiment except that the notches 12a, 12b and 12c are provided.

In the flow rate detecting element having the configuration as described above, the thermal conduction inhibiting member 13 is provided so as to cross the thermal conduction path of an insulating film comprising the support film 2 and the protecting film 3 from the sensor unit 10 to the fluid temperature measuring element 7. Therefore, the thermal conduction path of the insulating film comprising the support film 2 and the protecting film 3 has an increased thermal resistance, and the heat conducted from the sensor unit 10 through the flat substrate 1 to the fluid temperature measuring element 7 is reduced.

The notches 12a, 12b and 12c are provided so as to cross the thermal conduction path from the sensor unit 10 to the fluid temperature measuring element 7. The thickness of the flat substrate 1 at the portion provided with the notches 12a, 12b and 12c becomes therefore smaller, with an increased thermal resistance. The surface area of the thermal conduction path from the sensor unit 10 to the fluid temperature measuring element 7 becomes larger, and the heat conducted from the sensor unit 10 through the flat substrate 1 is released from the notches 12a, 12b and 12c. Further, the heat conducted from the sensor unit 10 to the fluid temperature measuring element 7 by-passes the notches 12a, 12b and 12c, leading to a longer thermal conduction path.

As a result, the heat conducted from the sensor unit 10 through the flat substrate 1 to the fluid temperature measuring element 7 is further reduced.

According to the tenth embodiment, as described above, in which the notches 12a, 12b and 12c and the thermal conduction inhibiting member 13 are provided in the thermal conduction path, temperature of the fluid temperature measuring element 7 is never affected by the heat generated in the heating resistance element 4, and it is possible to bring the fluid temperature measuring element 7 closer to the sensor unit 10. There is available a downsized flow rate detecting element.

Eleventh Embodiment

Figure 21:
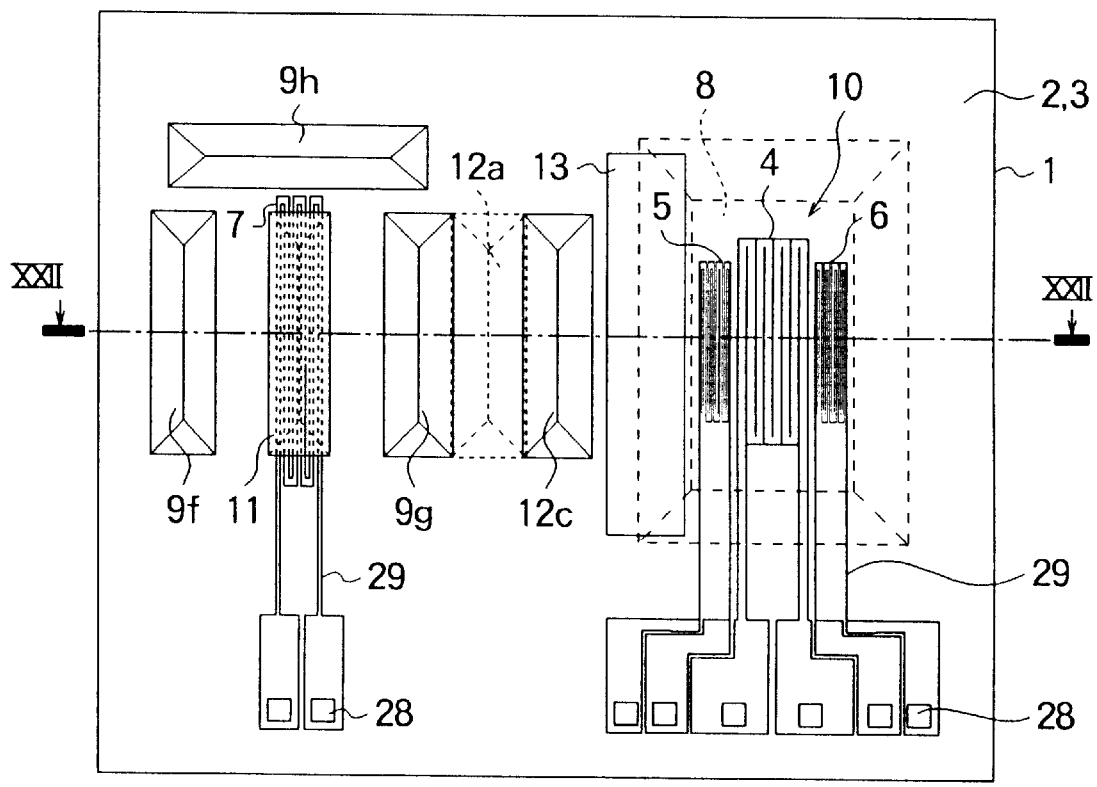
FIG. 21 is a plan view illustrating a thermosensitive flow rate detecting element of an eleventh embodiment of the invention.
Figure 22:
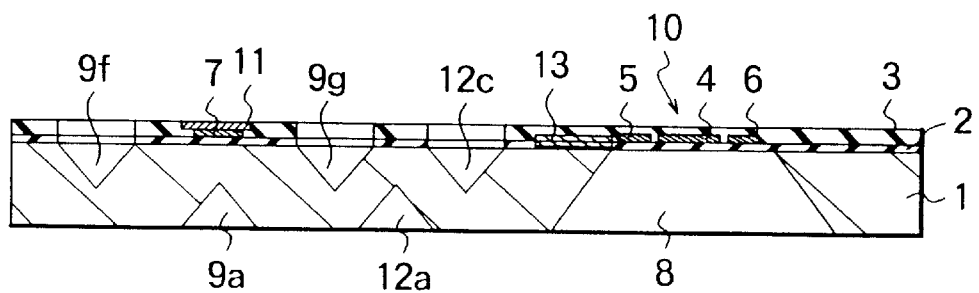
FIG. 22 is a sectional view of FIG. 21 cut along the line XXII—XXII.

FIG. 21 is a plan view illustrating a flow rate detecting element of an eleventh embodiment of the invention; and FIG. 22 is a sectional view of FIG. 21 cut along the line XXII—XXII.

In this eleventh embodiment, a thermal conduction inhibiting member 13 built in an insulating film comprising a support film 2 and a protecting film 3 is provided at a position between a sensor unit 10 and a fluid temperature measuring element 7. A notch 12a is provided at a position between the sensor unit 10 and the fluid temperature measuring element 7 from the back of a flat substrate 1 so as not to reach the support film 2. A notch 12c is provided at a position between the sensor unit 10 and the fluid temperature measuring element 7, from the surface of the flat substrate 1 by passing through the support film 2 and the protecting film 3, so as not to reach the back of the flat substrate 1. Another notch 9a is provided under the fluid temperature measuring element 7 from the back of the flat substrate 1 so as not to reach the support film 2. Further, three notches 9f, 9g and 9h are provided to surround the fluid temperature measuring element 7 from the surface of the flat substrate 1 by passing through the support film 2 and the protecting film 3 so as not to reach the back of the flat substrate 1.

In the flow rate detecting element having the configuration as described above, in which the notches 12a and 12c, and the thermal conduction inhibiting member 13 are provided to cross the thermal conduction path from the sensor unit 10 to the fluid temperature measuring element 7, the heat conducted from the sensor unit 10 through the flat substrate 1 to the fluid temperature measuring element 7 is reduced. As a result, temperature of the fluid temperature measuring element 7 is never affected by the heat generated in the heating resistance element 4, so that it is possible to bring the fluid temperature measuring element 7 closer to the sensor unit 10.

Because the notches 9a, 9f, 9g and 9h are provided near the fluid temperature measuring element 7, the heat capacity of the arranging portion of the fluid temperature measuring element 7 becomes smaller, improving response of the fluid temperature measuring element 7 to a change in fluid temperature. Therefore, even upon a sudden change in temperature of the measured fluid, temperature of the measured fluid is rapidly detected by the fluid temperature measuring element 7, and temperature of the heating resistance element 4 is controlled to a level higher by 200C than temperature of the measured fluid.

According to the eleventh embodiment, as described above, there is available a compact flow rate detecting element excellent in response.

In all the foregoing embodiments, the thermoresistance elements arranged on the both sides of the heating resistance element 4 are formed into identical lattice-shaped patterns, but may be formed into different lattice-shaped patterns. In this case, it suffices, in the process of measuring flow rate and flow velocity of the fluid, to compensate the quantity corresponding to temperature to be measured from the thermoresistance elements 5 and 6 with reference to the difference in lattice pattern between the thermoresistance elements 5 and 6, and then compare the same.

The foregoing embodiments have been described as being applied to a diaphragm-type flow rate detecting element, but the same effects are available even by applying to a bridge-type flow rate detecting element.

In the foregoing embodiments, silicon nitride is used as the material for the support film 2 and the protecting film 3. The material for the support film 2 and the protecting film 3 is not limited to silicon nitride, but any material having insulating property may be adopted, including, for example, tantalum pentoxide ($Ta_2O_5$) and silicon dioxide ($SiO_2$). Platinum for the heating resistance element 4, the thermoresistance elements 5 and 6, and the fluid temperature measuring element 7. The material for the heating resistance element 4, the thermoresistance elements 5 and 6, and the fluid temperature measuring element 7 is not limited to platinum, but any resistance material having temperature dependency may be adopted, including, for example, permalloy which is an alloy of iron and nickel.

Figure 26:
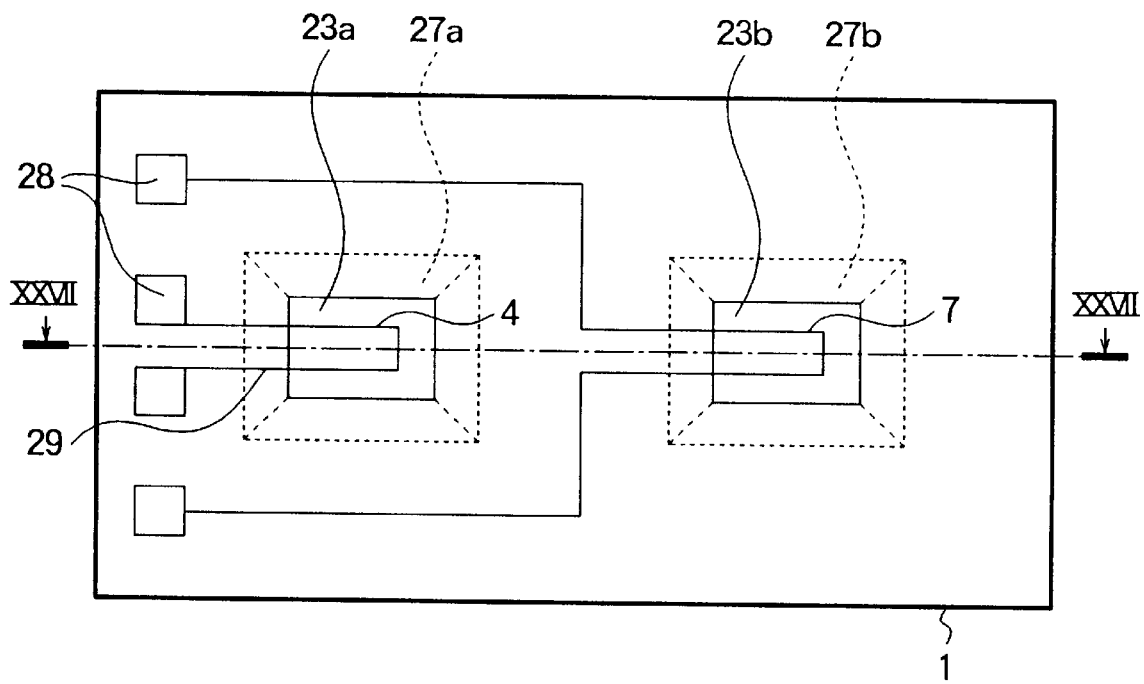
FIG. 26 is a plan view illustrating a conventional thermosensitive flow rate detecting element.
Figure 27:
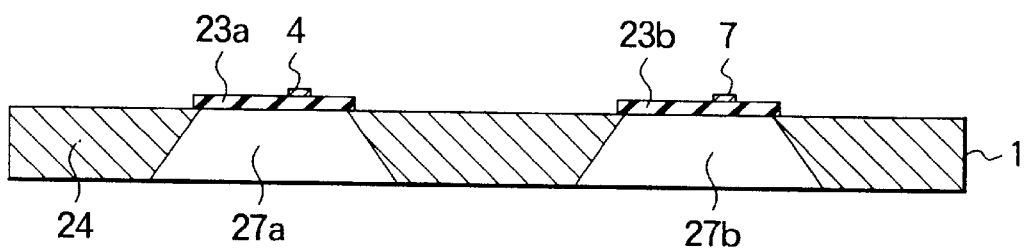
FIG. 27 is a sectional view of FIG. 26 cut along the line XXVII-XVII.

In the foregoing embodiments, the flow rate detecting element has a sensor unit 10 comprising a heating resistance element 4 and a pair of thermoresistance elements 5 and 6 wrapped by a support film 2 and a protecting film 3. However, the flow rate detecting element to which the invention is applicable is not limited to the above, but the invention is applicable also to a conventional flow rate detecting element having a sensor unit comprising a heating resistance element 4 formed on a support film 2 as shown in FIGS. 26 and 27. In this case, the heating resistance element 4 serves as a heating element and a thermosensitive element.

The invention is not limited to the foregoing embodiments, but is applicable to a combination of any embodiments.

Twelfth Embodiment

Figure 23:
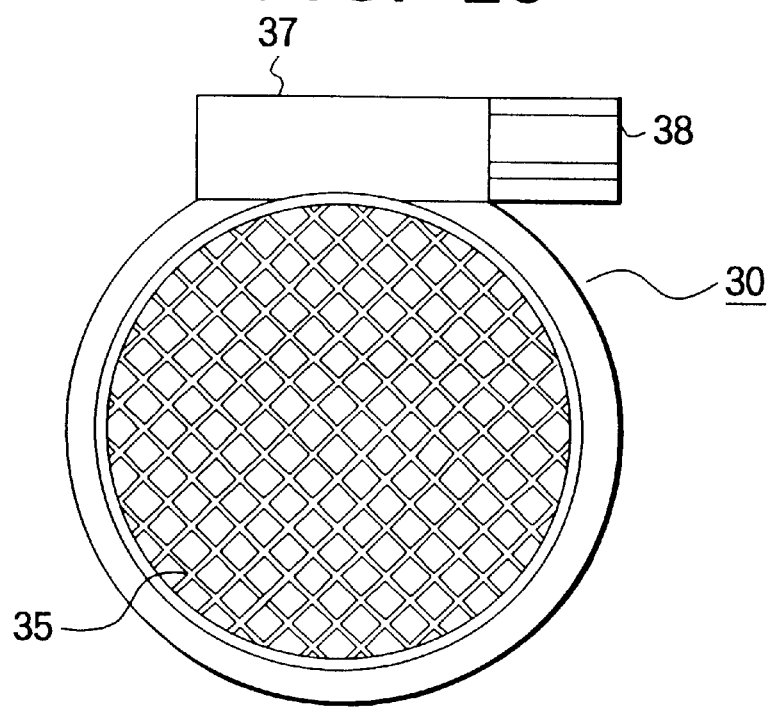
FIG. 23 is a front view illustrating a flow rate sensor of the twelfth embodiment of the invention.
Figure 24:
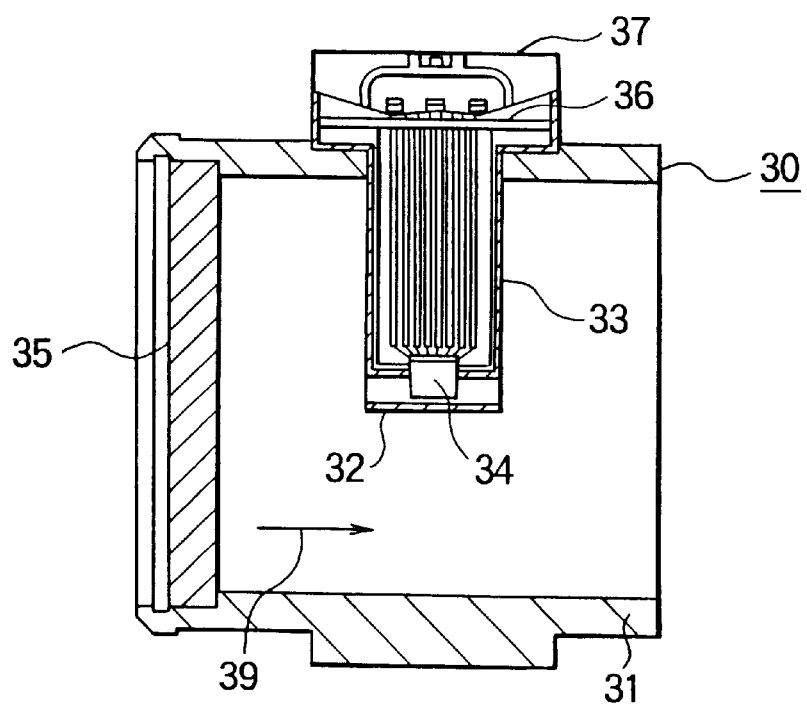
FIG. 24 is a sectional view illustrating a flow rate sensor of the twelfth embodiment of the invention.

FIGS. 23 and 24 are a front view and a sectional view, respectively, illustrating a flow rate sensor of a twelfth embodiment of the invention.

In FIGS. 23 and 24, a main pipe 31 has a cylindrical shape, and forms a path for a measured fluid. A cylindrical measuring duct 32 is supported by a supporting arm 33 radially extending from an inner wall surface of the main pipe 31 and coaxially arranged. In this measuring duct 32, a flow rate detecting element 34 of the foregoing first embodiment is arrange, with the arrangement direction of a heating resistance element and a pair of thermoresistance element in alignment with the axial center direction of the measuring duct 32.

A lattice-shaped rectifier 35 for rectifying the measured fluid is attached to an end side of the main pipe 31. A control circuit 36 serving as a controller and a temperature measuring unit is housed in a case 37 provided on the outer periphery of the main pipe 31. The control circuit 36 is electrically connected, through electrode pads, to the heating resistance element, the thermoresistance element and the fluid temperature measuring element of the flow rate detecting element 34. The case 37 is provided with a connector 38 for supplying current to the flow rate detecting element 34 and taking out an output signal.

The flow rate sensor 30 having the configuration as described above is attached, for example, to an inlet pipe of an internal combustion engine, and applied for measurement of the quantity of inlet air. In this case, the inlet pipe corresponds to the main pipe 31.

In the flow rate sensor 30, current is supplied through the connector 38 to the flow rate detecting element 34, and temperature of the heating resistance element is controlled by thee control circuit 36 to a level higher by 200C than the air temperature measured by the fluid temperature measuring element. Temperature of the pair of thermoresistance elements is measured by the control circuit 36, and provided as an output through the connector 38.

The inlet air is rectified by the rectifier 35 and flows into the main pipe 31 as shown by an arrow 39 in the drawing. Part of the air flowing into the main pipe 31 then flows into the measuring duct 32, runs along the sensor surface of the flow rate detecting element 34, and flows from the thermoresistance element on one side to the thermoresistance element on the other side.

The flow of air 39 causes a decrease in temperature of the thermoresistance element in the upstream and an increase in temperature of the thermoresistance element in the downstream. Temperature of the pair of thermoresistance elements is measured through the control circuit 36. As described in the foregoing first embodiment, an air flow rate, a flow direction or a flow velocity is detected on the basis of the temperature difference between the pair of thermoresistance elements, and provided for control of the quantity of inlet air of the internal combustion engine.

According to the twelfth embodiment, therefore, the flow rate detecting element 34 has the same configuration as that the foregoing first embodiment. There is therefore available a flow rate sensor having a good response, together with a sufficient strength.

The flow rate sensor 30 is therefore well applicable even for measurement of a quantity of inlet air of an automobile internal combustion engine suffering a sudden change in temperature of inlet air.

The flow rate sensor 30 well withstands measurement of a quantity of inlet air in an internal combustion engine in which the maximum flow velocity of inlet air reaches even 200 m/s.

In the foregoing twelfth embodiment, the flow rate detecting element of the foregoing first embodiment is used as the flow rate sensor 30. However, the same effects are available even by using the flow rate detecting element of any other embodiment.

According to the invention having the configuration as described above, the following effects are available.

According to the invention, there is provided a thermosensitive flow rate detecting element comprising a flat substrate provided with a gap having an opening on at least one side thereof for the flow of a fluid, an insulating support film provided on that one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on the one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein a first notch is provided on the flat substrate near the fluid temperature measuring element and is formed by removing a part of the flat substrate from either side thereof so as not to reach the remaining side thereof. As a result, the heat capacity of the arrangement portion of the fluid temperature measuring element becomes smaller, improving response of the fluid temperature measuring element to a change in fluid temperature, and because of the first notch not passing through completely the flat substrate, the fluid temperature measuring element has a higher strength. There is therefore available a thermosensitive flow rate detecting element excellent in response and reliability.

Since the first notch is formed under the portion of the arrangement region of the fluid temperature measuring element on the other side of the flat substrate, the heat capacity of the arrangement portion of the fluid temperature measuring element can be reduced, and response of the fluid temperature measuring element to a change in temperature of the measured fluid is improved.

Because the first notchs are formed on the outer periphery of the fluid temperature measuring element on one side of the flat substrate, the heat capacity of the arrangement portion of the fluid temperature measuring element can be reduced, and response of the fluid temperature measuring element to a change in temperature of the measured fluid is improved.

As the first notchs are formed on the outer periphery of the fluid temperature measuring element on the other side of the flat substrate, the heat capacity of the arrangement portion of the fluid temperature measuring element can be reduced, and response of the fluid temperature measuring element to a change in temperature of the measured fluid is improved.

A thin film comprising a good conductive material is provided on the upper portion of the fluid temperature measuring element in a state insulated from the fluid temperature measuring element. It is therefore possible to reduce thermal resistance of the fluid temperature measuring element, and to improve response of the fluid temperature measuring element to a change in temperature of the measured fluid.

Further, a second notch formed by removing a part of the flat substrate is provided on a portion of the flat substrate between the sensor unit and the fluid temperature measuring element, so as to cross a thermal conduction path from the sensor unit to the fluid temperature measuring element. As a result, thermal resistance of the thermal conduction path from the sensor unit to the fluid temperature measuring element becomes larger, and the heat conducted from the sensor unit through the thermal conduction path to the fluid temperature measuring element is released from the surface of the second notch. Thermal conduction from the sensor unit to the fluid temperature measuring element is inhibited, permitting reduction of the distance between the sensor unit and the fluid temperature measuring element, and hence downsizing.

Since the second notch is formed on the other side of the flat substrate, thermal resistance of the thermal conduction path from the sensor unit to the fluid temperature measuring path becomes larger, and the heat conducted from the sensor unit through the thermal conduction path to the fluid temperature measuring element is released from the surface of the second notch. It is thus possible to inhibit thermal conduction from the sensor unit to the fluid temperature measuring element.

The second notch is formed on one side of the flat substrate. Therefore, thermal resistance of the thermal conduction path from the sensor unit to the fluid temperature measuring element becomes larger, and the heat conducted from the sensor unit to the fluid temperature measuring element through the thermal conduction path is released from the surface of the second notch. Further, the heat conducted from the sensor unit through the thermal conduction path by-passes the second notch and conducted to the fluid temperature measuring element. It is therefore possible to increase the length of the thermal conduction path. It is thus possible to further inhibit thermal conduction from the sensor unit to the fluid temperature measuring element.

A thermal conduction inhibiting member comprising a low-thermal-conductivity material is provided between the sensor unit and the fluid temperature measuring element so as to cross a thermal conduction path from the sensor unit to the fluid temperature measuring element. Thermal resistance of the thermal conduction path from the sensor unit to the fluid temperature measuring element therefore becomes larger, and it is possible to inhibit thermal conduction from the sensor unit to the fluid temperature measuring element.

According to the invention, there is provided a thermosensitive flow rate detecting element comprising a flat substrate provided with a gap having an opening on at least one side thereof for the flow of a fluid, an insulating support film provided on that one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on that one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein a thin film comprising a good-thermal-conductivity material is provided in the upper portion of the fluid temperature measuring element in a state electrically insulated from the fluid temperature measuring element. It is therefore possible to reduce thermal resistance of the fluid temperature measuring element, and improve response of the fluid temperature measuring element to a change in fluid temperature. Because no notch is provided on the flat substrate, the fluid temperature measuring element has an increased strength, and there is available a thermosensitive flow rate detecting element excellent in response and reliability.

Further, according to the invention, there is provided a thermosensitive flow rate detecting element comprising a flat substrate provided with a gap having an opening on at least one side thereof for the flow of a fluid, an insulating support film provided on that one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on that one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein a second notch formed by removing a part of the flat substrate is provided on a portion of the flat substrate between the sensor unit and the fluid temperature measuring element, so as to cross a thermal conduction path from the sensor unit to the fluid temperature measuring element. Thermal resistance of the thermal conduction path from the sensor unit to the fluid temperature measuring element becomes larger, and the heat conducted from the sensor unit to the fluid temperature measuring element through the thermal conduction path is released from the surface of the notch, permitting inhibition of thermal conduction from the sensor unit to the fluid temperature measuring element. It is thus possible to reduce the distance between the sensor unit and the fluid temperature measuring element, and there is available a compact thermosensitive flow rate detecting element.

Further, according to the invention, there is provided a thermosensitive flow rate detecting element comprising a flat substrate provided with a gap having an opening on at least one side thereof for the flow of a fluid, an insulating support film provided on that one side of the substrate, a sensor unit which comprises a heating element for heating the fluid and a thermosensitive element for detecting temperature of the fluid provided in the upper position of the opening on the insulating support film, and a fluid temperature measuring element, provided at a distance from the sensor unit on that one side of the flat substrate, for detecting temperature of the fluid; the thermosensitive flow rate detecting element measuring flow rate or flow velocity of the fluid on the basis of a temperature detected by the thermosensitive element, by keeping heating temperature of the heating element at a level higher than a temperature detected by the fluid temperature measuring element by a prescribed difference in temperature; wherein thermal conduction inhibiting member having a thermal conductivity lower than those of the supporting film and the protecting film are provided at portions corresponding to the supporting film and the protecting film between the sensor unit and the fluid temperature measuring element, so as to cross a thermal conduction path from the sensor unit to the fluid temperature measuring element. Thermal resistance of the thermal conduction path from the sensor unit to the fluid temperature measuring element becomes larger, and thermal conduction from the sensor unit to the fluid temperature measuring element can be inhibited. It is thus possible to reduce the distance between the sensor unit and the fluid temperature measuring element, and there is available a downsized thermosensitive flow rate detecting element.

According to the invention, furthermore, there is provided a flow rate sensor comprising a measuring duct, having a cylindrical shape, arranged within a path of a fluid to be measured with the axial direction thereof substantially in alignment with the flow direction of the fluid to be measured; any of the foregoing thermosensitive flow rate detecting elements; and a control unit for controlling current supplied to the heating resistance element so as to keep a prescribed temperature difference between temperature of the heating resistance element and temperature of the fluid temperature measuring element; wherein a flow rate or a flow velocity of the fluid is measured on the basis of thermal conduction phenomenon from the portion heated by the heating resistance element to the fluid to be measured.

What is claimed is:

1. A thermosensitive flow rate detecting element comprising:

a flat substrate provided with a gap having an opening on at least one side thereof for the flow of a fluid;

an insulating support film provided on said one side of said flat substrate;

a sensor unit which comprises a heating element for heating said fluid and a thereoosensitive element for detecting temperature of said fluid provided in the upper position of said opening on said insulating support film; and a fluid temperature measuring element, provided at a distance from said sensor unit on said one side of said flat substrate, for detecting temperature of said fluid, wherein said thermosensitive flow rate detecting element measures flow rate or flow velocity of said fluid on the basis of a temperature detected by said thermosensitive element, by keeping heating temperature of said heating element at a level higher than a temperature detected by said fluid temperature measuring element by a prescribed difference in temperature, and wherein a first notch is provided on said flat substrate near said fluid temperature measuring element and is formed by removing a part of said flat substrate from either side thereof so as not to reach the remaining side thereof.

2. The thermosensitive flow rate detecting element according to claim 1, wherein said first notch is formed under the arrangement region of said fluid temperature measuring element on the other side of the flat substrate.

3. The thermosensitive flow rate detecting element according to claim 2, further comprising said first notchs formed on the outer periphery of said fluid temperature measuring element on said one side of the flat substrate.

4. The thermosensitive flow rate detecting element according to claim 2, further comprising said first notchs formed on the outer periphery of said fluid temperature measuring element on the other side of the flat substrate.

5. The thermosensitive flow rate detecting element according to claim 2, further comprising a thin film made of a conductive material which is provided on the upper portion of said fluid temperature measuring element in a state insulated from said fluid temperature measuring element.

6. The thermosensitive flow rate detecting element according to claim 2, further comprising a second notch formed by removing a part of the flat substrate which is provided on a portion of said flat substrate between said sensor unit and the fluid temperature measuring element, so as to cross a thermal conduction path from said sensor unit to said fluid temperature measuring element.

7. The thermosensitive flow rate detecting element according to claim 2, further comprising a thermal conduction inhibiting member made of a low-thermal-conductivity material which is provided between said sensor unit and said fluid temperature measuring element so as to cross a thermal conduction path from said sensor unit to said fluid temperature measuring element.

8. The thermosensitive flow rate detecting element according to claim 1, wherein said first notchs are formed on the outer periphery of said fluid temperature measuring element on said one side of the flat substrate.

9. The thermosensitive flow rate detecting element according to claim 1, wherein said first notchs are formed on the outer periphery of said fluid temperature measuring element on the other side of the flat substrate.

10. The thermosensitive flow rate detecting element according to claim 1, further comprising a thin film made of a 112 conductive material which is provided on the upper portion of said fluid temperature measuring element in a state insulated from said fluid temperature measuring element.

11. The thermosensitive flow rate detecting element according to claim 1, further comprising a second notch formed by removing a part of the flat substrate which is provided on a portion of said flat substrate between the sensor unit and the fluid temperature measuring element, so as to cross a thermal conduction path from said sensor unit to said fluid temperature measuring element.

12. The thermosensitive flow rate detecting element according to claim 11, wherein said second notch is formed on the other side of the flat substrate.

13. The thermosensitive flow rate detecting element according to claim 11, wherein said second notch is formed on said one side of the flat substrate.

14. The thermosensitive flow rate detecting element according to claim 1, further comprising a thermal conduction inhibiting member made of a low-thermal-conductivity material which is provided between said sensor unit and said fluid temperature measuring element so as to cross a thermal conduction path from said sensor unit to said fluid temperature measuring element.

15. A thermosensitive flow rate detecting element comprising;

a flat substrate provided with a gap having an opening on at least one side thereof for the flow of a fluid;

an insulating support film provided on said one side of the substrate;

a sensor unit which comprises a heating element for heating said fluid and a thermosensitive element for detecting temperature of said fluid provided in the upper position of said opening on said insulating support film; and a fluid temperature measuring element, provided at a distance from said sensor unit on said one side of said flat substrate, for detecting temperature of said fluid, wherein said thermosensitive flow rate detecting element measures flow rate or flow velocity of said fluid on the basis of a temperature detected by said thermosensitive element, by keeping heating temperature of said heating element at a level higher than a temperature detected by said fluid temperature measuring element by a prescribed difference in temperature, and wherein a second notch formed by removing a part of the flat substrate is provided on a portion of said flat substrate between the sensor unit and the fluid temperature measuring element, so as to cross a thermal conduction path from said sensor unit to said fluid temperature measuring element.

16. A flow rate sensor comprising:

a measuring duct, having a cylindrical shape, arranged within a path of a fluid to be measured with the axial direction thereof substantially in alignment with the flow direction of the fluid to be measured;

a thermosensitive flow rate detecting element comprising a flat substrate provided with a gap having an opening on at least one side, an insulating support film provided on one side of the substrate, a sensor unit which comprises a heating element for heating said fluid and a thermosensitive element for detecting temperature of said fluid provided in the upper position of said opening on said insulating support film, and a fluid temperature measuring element, provided at a distance from said sensor unit on said one side of said flat substrate, for detecting temperature of said fluid, and a notch provided on said flat substrate near said fluid temperature measuring element and formed by removing a part of said flat substrate from either side thereof so as not to reach the remaining side thereof, said thermosensitive flow rate detecting element being provided in said measuring duct with the arranging direction of said heating element and said thermosensitive element in alignment with the axial direction of said measuring duct; and a control unit for controlling electric current supplied to said heating resistance element so as to keep the temperature of said heating resistance element at a prescribed value higher than the temperature of said fluid temperature measuring element; whereby a flow rate or a flow velocity of said fluid being measured on the basis of thermal conduction phenomenon from the portion heated by said heating resistance element to said fluid to be measured.

* * * * *